United States Patent [19]

Oomuro et al.

[11] Patent Number: 5,258,979
[45] Date of Patent: Nov. 2, 1993

[54] ATM COMMUNICATION SYSTEM WITH OPTIMAL TRAFFIC CONTROL BY CHANGING THE ALLOCATED BANDWIDTH

[75] Inventors: Katsumi Oomuro, Kawasaki; Naoyuki Miyamoto, Tama; Tetsuo Nishino, Kawasaki; Osamu Isono, Kawasaki; Tetsuo Tachibana, Kawasaki; Ryuji Hyodo, Kawasaki, all of Japan

[73] Assignee: Fujitsu Limited, Kawasaki, Japan

[21] Appl. No.: 672,456

[22] Filed: Mar. 20, 1991

[30] Foreign Application Priority Data

Mar. 20, 1990 [JP] Japan .................................. 2-068024
Mar. 20, 1990 [JP] Japan .................................. 2-072395

[51] Int. Cl.$^5$ ............................................. H04J 3/16
[52] U.S. Cl. ..................................... 370/95.1; 370/80
[58] Field of Search ............... 370/95.1, 91, 92, 93, 370/77, 79, 80, 102, 60, 94.1

[56] References Cited

U.S. PATENT DOCUMENTS

| | | | |
|---|---|---|---|
| 4,740,891 | 4/1988 | Kirkpatrick | 370/91 |
| 4,956,839 | 9/1990 | Torii et al. | 370/94.1 |
| 5,029,164 | 7/1991 | Goldstein et al. | 370/95.1 |

OTHER PUBLICATIONS

XIII International Switching Symposium Stockholm, Sweden May 27–Jun. 1, 1990 Proceedings Tuesday afternoon, May 29, 1990 vol. 3 of 6.
The Transactions of the Institute of Electronics, Information and Communication Engineers(Japan) vol. 89 No. 33 May 18, 1989.
The Transactions of the Institute of Electronics, Information and Communication Engineers(Japan) vol. 89 No. 195 Sep. 20, 1989.

*Primary Examiner*—Douglas W. Olms
*Assistant Examiner*—Shick Hom
*Attorney, Agent, or Firm*—Staas & Halsey

[57] ABSTRACT

An ATM communication system including an ATM switching network which includes a plurality of ATM exchanges and controls exchanges among a plurality of terminal equipment and a management apparatus which manages the traffic in the ATM switching network; the ATM switching network including a notifying unit which notifies the terminal equipment of the allocable bandwidth which can be used in accordance with the amount of traffic in the ATM switching network; when the notified allocable bandwidth is a bandwidth which can be used for their communication, the terminal equipment starting the communication in the range of that bandwidth.

23 Claims, 37 Drawing Sheets

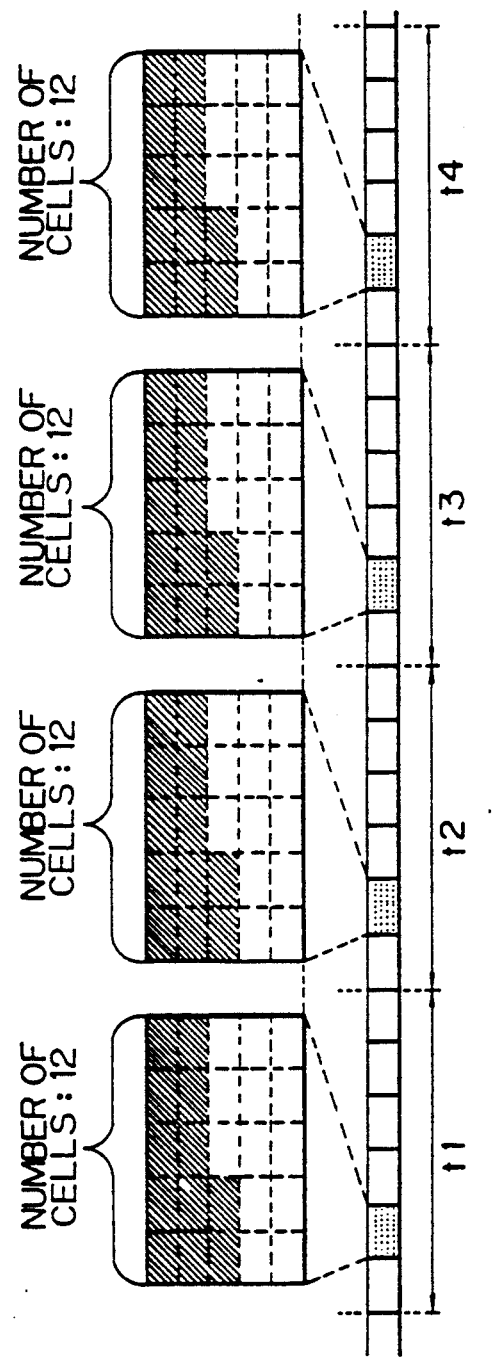

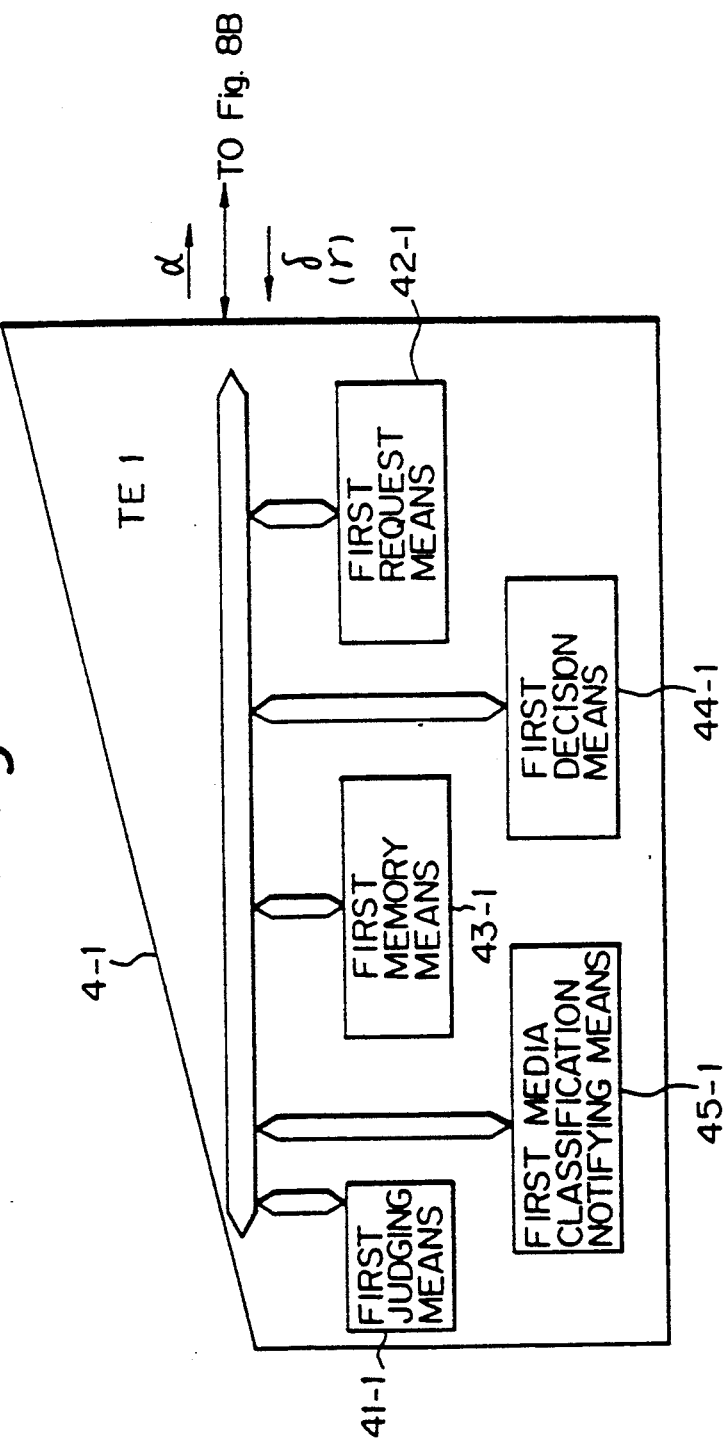

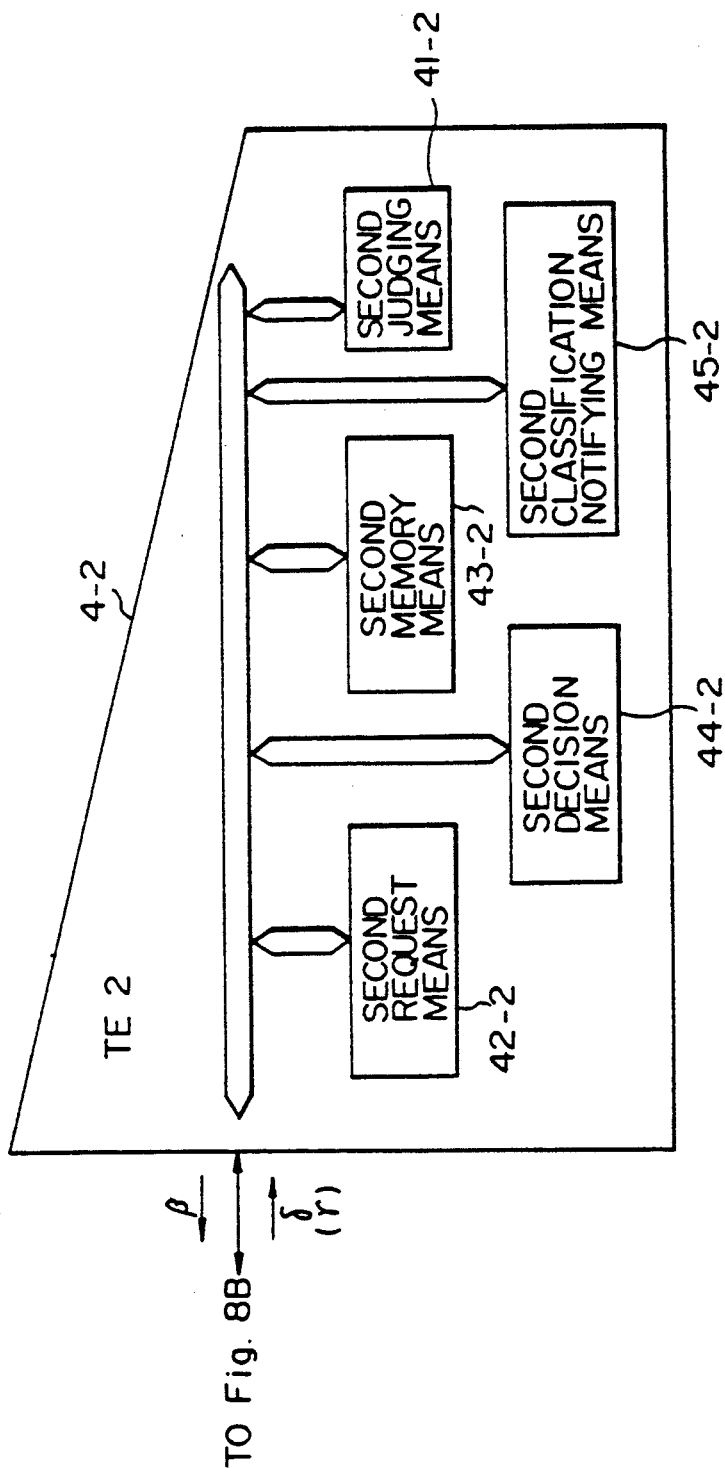

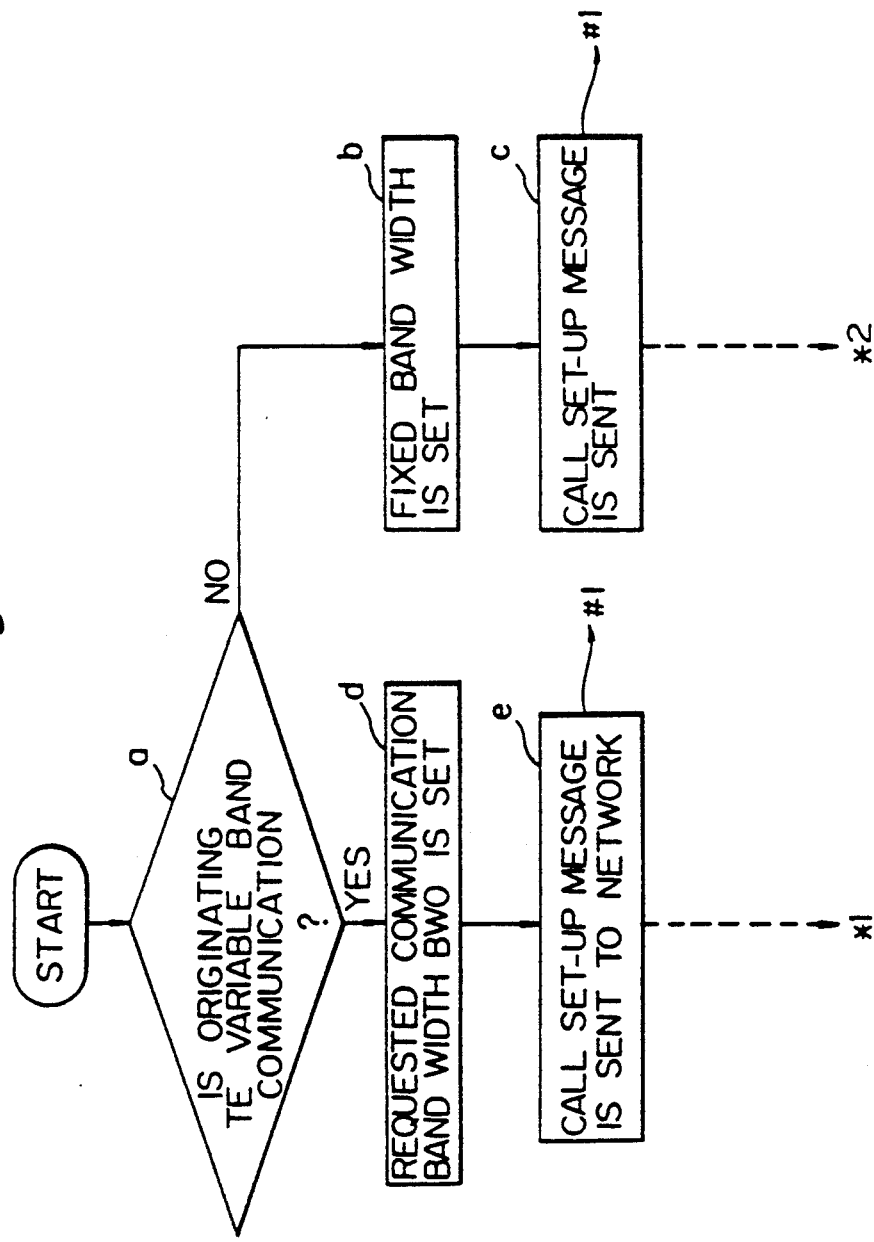

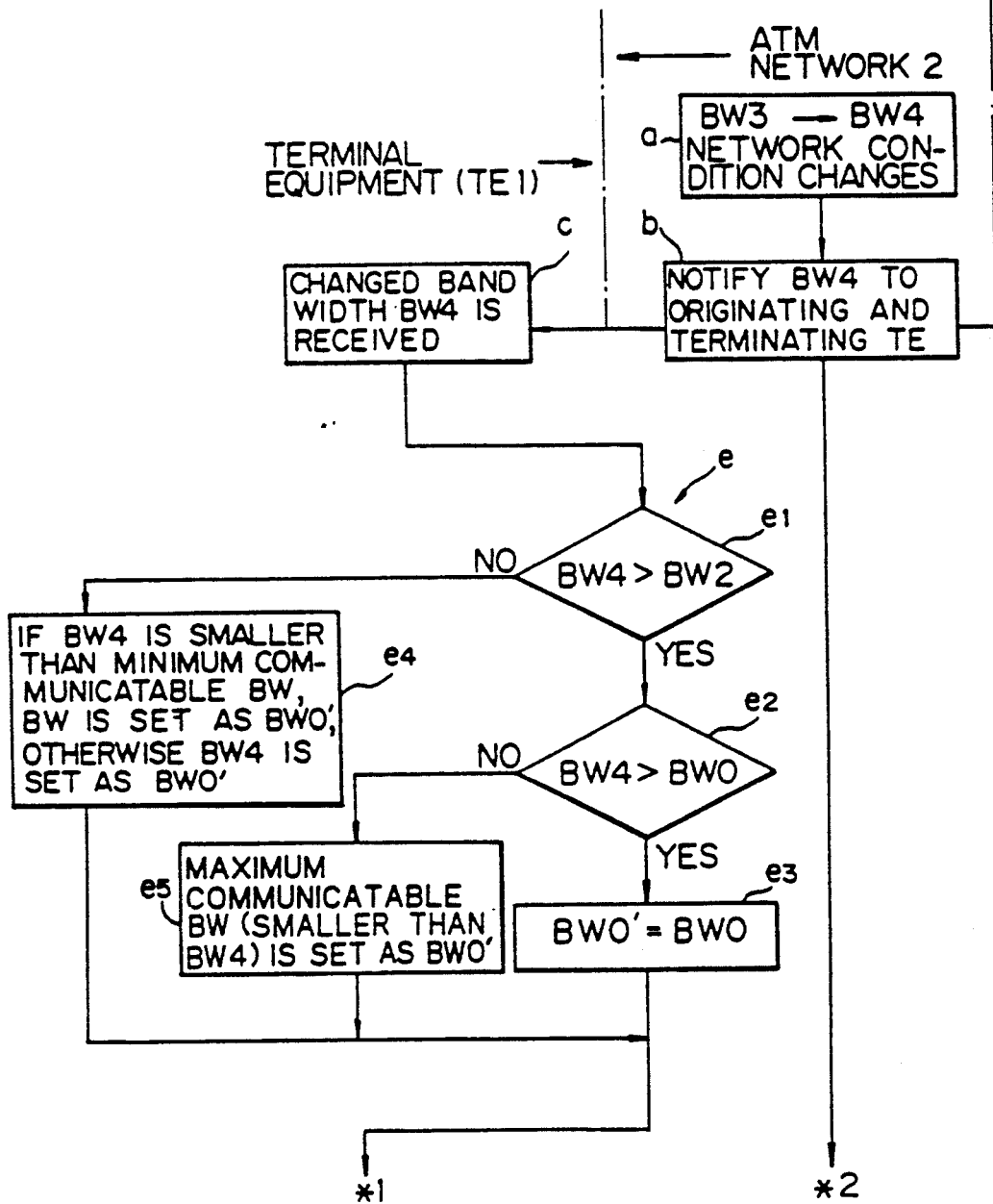

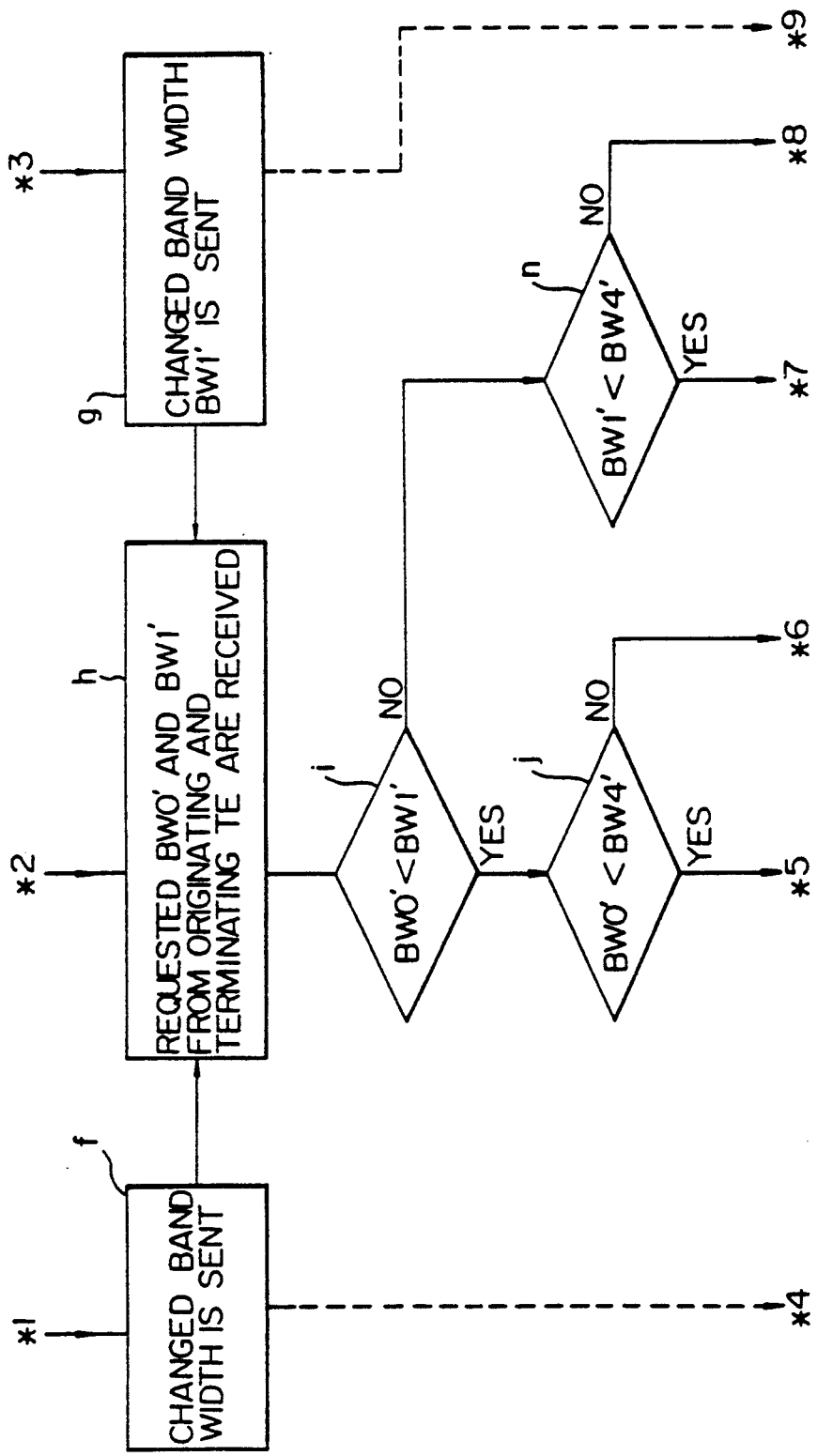

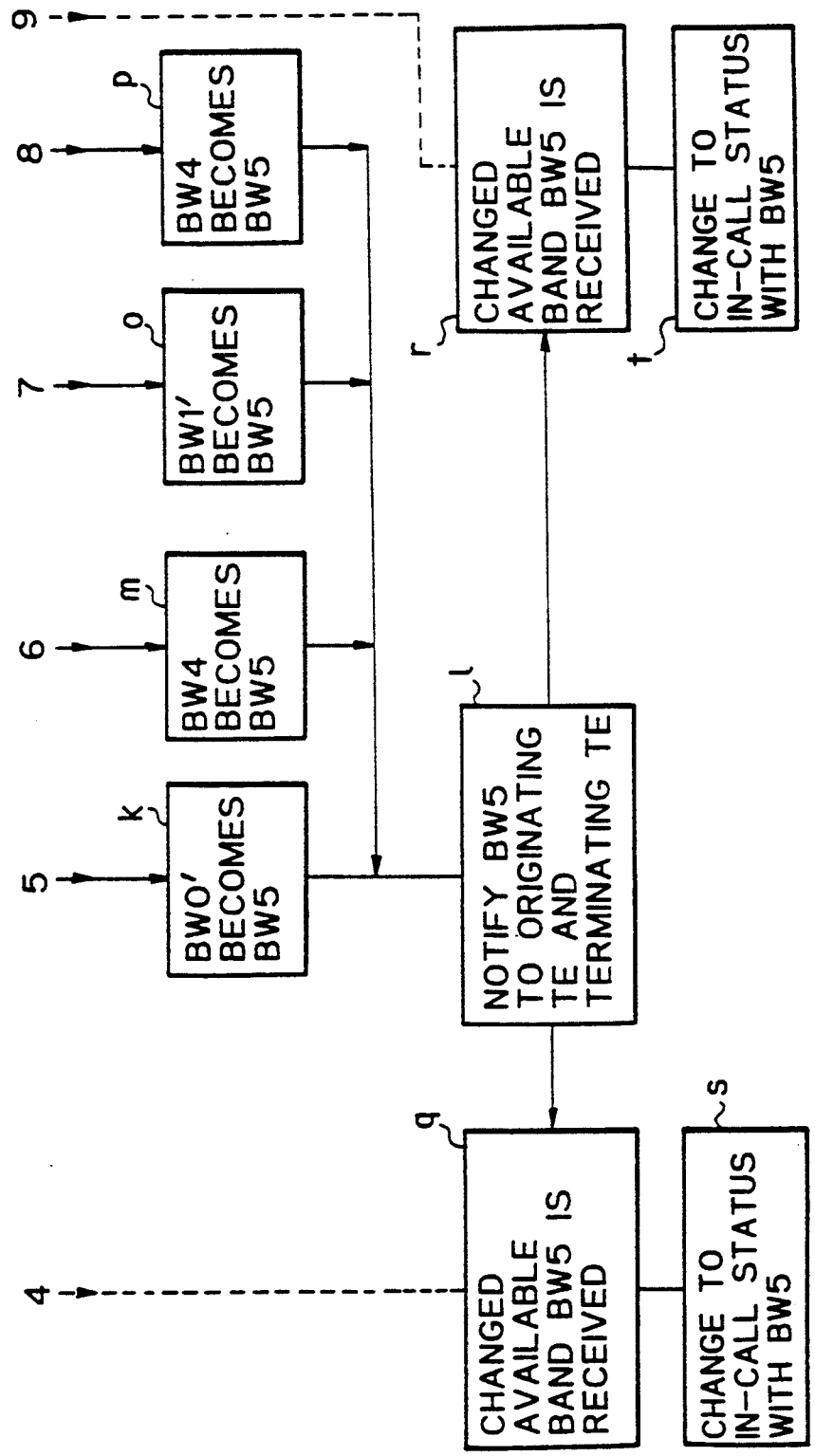

ATM COMMUNICATION SYSTEM WITH OPTIMAL TRAFFIC CONTROL BY CHANGING THE ALLOCATED BANDWIDTH

BACKGROUND OF THE INVENTION

1. Field of the Invention

The present invention relates to an asynchronous transfer mode (ATM) communication system.

In recent years, the spread of data communications has led to the use of public lines not only for conventional voice communications but also transfer of important data. Future communication networks, therefore, have to be able to transfer and exchange data with a higher quality. As a communication service network able to handle not only 64 Kb/s voice communications and low speed data, but also 150 Mb/s high speed data for moving images such as for television and high definition television images, attention is now being drawn by broadband integrated service digital networks (B-ISDN). These are now reaching the commercialization stage and are being standardized as to their interfaces. In a B-ISDN, unlike the conventional exchange method, use is made of ATM so as to enable equal handling of voice communications, low speed data, moving images, and other information of different speeds. That is, in an ATM switching network, information with different bandwidths are transferred and exchanged held in units of certain lengths called "cells", for the purpose of differentiation from conventional package communication.

2. Description of the Related Art

Such ATM includes variable bit rate (VBR) communication wherein cells (units of transfer of information in ATM) are produced and transferred each time information for communication is produced and constant bit rate (CBR) communication wherein cells are transferred periodically regardless of the existence of information as in the conventional communication systems.

An explanation will be made later, referring to the figures, of the concept of VBR communication, the concept of CBR communication, and the processing sequences, but here note that in the conventional processing sequence, when the communication bandwidth requested by a terminal equipment at the time of a call setup is larger than the allocable bandwidth of the ATM network, that communication cannot be received and the call is disconnected.

Therefore, communication cannot be performed until the allocable bandwidth at the ATM switching network side satisfies the requested bandwidth and the terminal equipment must repeatedly originate calls until it is allocable. That operation is not only forced on the terminal equipment side, but also results in meaningless processing performed on the ATM switching network side.

For the terminal equipment, there is the problem that when communication is not possible at the requested bandwidth, even if communication is desired at a lower communication quality for a while, that communication is not allowed.

Still further, in the state where communication has begun between two pieces of terminal equipment for which communication is allowed, when desiring to change the communication bandwidth due to a change in the traffic at the ATM switching network side, that change is not allowed and therefore there was the problem that efficient use of the communication lines and other resources on the ATM switching network side was not possible.

SUMMARY OF THE INVENTION

Accordingly, an object of the present invention is to provide an ATM communication system and ATM communication method in which the above problems can be resolved and the resources of the ATM switching network can be utilized efficiently at a constantly high efficiency by all the terminal equipment.

To attain the above object, the present invention is constituted as follows: This ATM communication system includes an ATM switching network which includes a plurality of ATM exchanges and can control the exchange among a plurality of terminal equipment and a management apparatus which manages the traffic in the ATM switching network, the ATM switching network including a notifying means which notifies the terminal equipment of the allocable bandwidth which can be used in accordance with the amount of traffic in the ATM switching network, and the terminal equipment starts the communication in the range of the bandwidth when the notified allocable bandwidth is a bandwidth which is allowable for its own communication.

BRIEF DESCRIPTION OF THE DRAWINGS

The above object and features of the present invention will be more apparent from the following description of the preferred embodiments with reference to the accompanying drawings, wherein:

FIG. 2A is a view of the concept of CBR communication;

FIG. 8A, FIG. 8B, and FIG. 8C are view showing the basic constitution of the system based on the present invention based on the state where two pieces of terminal equipment are further incorporated for mutual communication;

FIG. 13A and FIG. 13B are views showing the processing flow during call setup of an originating terminal equipment;

FIG. 16B, and FIG. 16C are processing flow charts for changing the state of bandwidth during communication;

DESCRIPTION OF THE PREFERRED EMBODIMENTS

Before describing the embodiments of the present invention, the related art and the disadvantages therein will be described with reference to the related figures.

Figure 1:
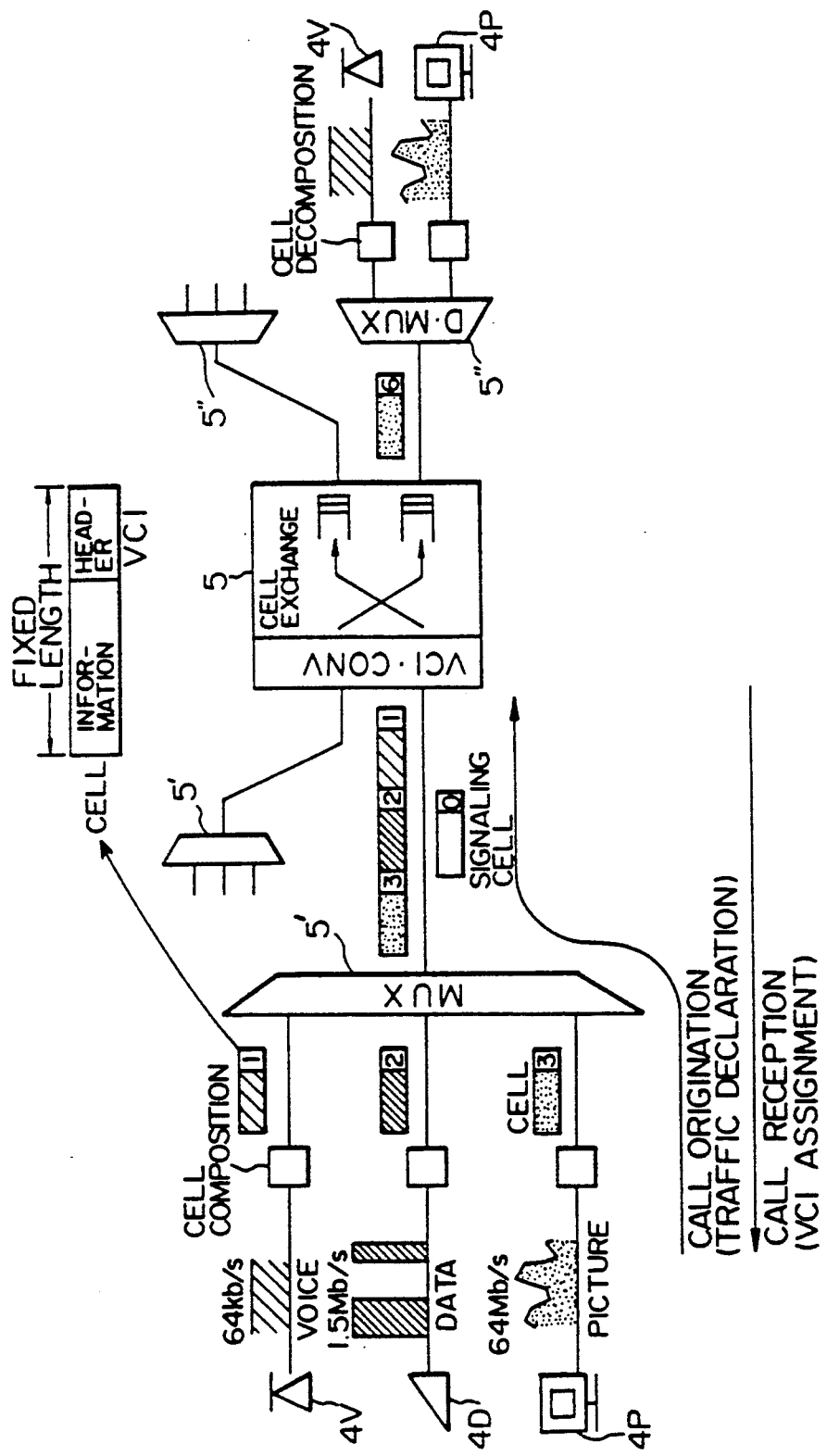
FIG. 1 is a view illustrating the general constitution of an ATM communication system.

FIG. 1 is a view illustrating the general constitution of an ATM communication system. In the figure, information from a voice terminal equipment 4V, a data terminal equipment 4D, and a picture terminal equipment 4P is composed into cells and then multiplexed by a multiplexer 5'. Further, VCI conversion is performed on the cells at the input stage of the ATM exchange 5, then cell exchange is performed. The structure of the cells is shown at the upper part of the figure and consists of an information part and a header part. The header part includes a virtual channel number (VCI).

The cell group output from the ATM exchange 5 is demultiplexed by the demultiplexer 5", then decomposed into the individual information, which is sent to the corresponding terminal equipment of the other side.

Next, an explanation will be made of the general CBR and VBR communication performed in the general ATM communication system shown in FIG. 1.

Figure 2B:
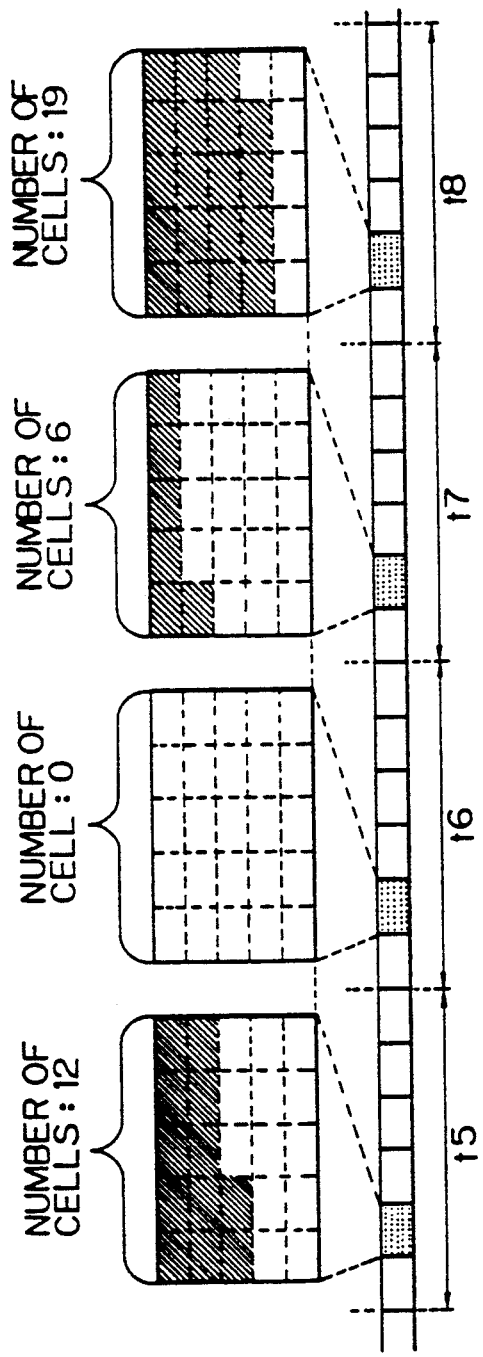
FIG. 2B is a view of the concept of VBR communication.

FIG. 2A is a view of the concept of CBR communication, and FIG. 2B is a view of the concept of VBR communication. In the figure, the transmission slots allocated periodically to the subscribers are constituted of a plurality of cells, the overall number of cells being the maximum amount of information which can be transmitted at one time. In the CBR communication of FIG. 2A, 12 cells are always transferred at a time at set intervals as shown by t1 to t4, so the amount of information transmitted per unit time is fixed and the traffic management at the ATM network side can be treated the same as that in the conventional line exchange art.

On the other hand, in the VBR communication of FIG. 2B, the interval at which cells are transferred is irregular due to the principle of communication mentioned above. When the amount of information is large as at t8, a plurality of cells commensurate with the amount of information, for example, 19, are transferred per unit time. Also, if there is no information for a unit of time, nothing is transferred, as shown at t6. Therefore, the bandwidth of the transmitted information is not constant even during a call, but can handle fluctuations of, for example, a maximum value of 150 Mb/s and a minimum value of 30 Mb/s and therefore can efficiently accommodate moving picture information etc. where the amount of information communicated fluctuates tremendously. Further, multiplexing is performed without distinction as to line data and packet data in the cell units, so different data can be transferred flexibly and efficient use may be made of the transmission line, making this system promising for future communication systems. The terminal equipment makes standby restrictions for when there is a large amount of information to be transmitted and performs processing for thinning out processing data of coding circuits performing the signal processing in the case of picture data.

Figure 3:
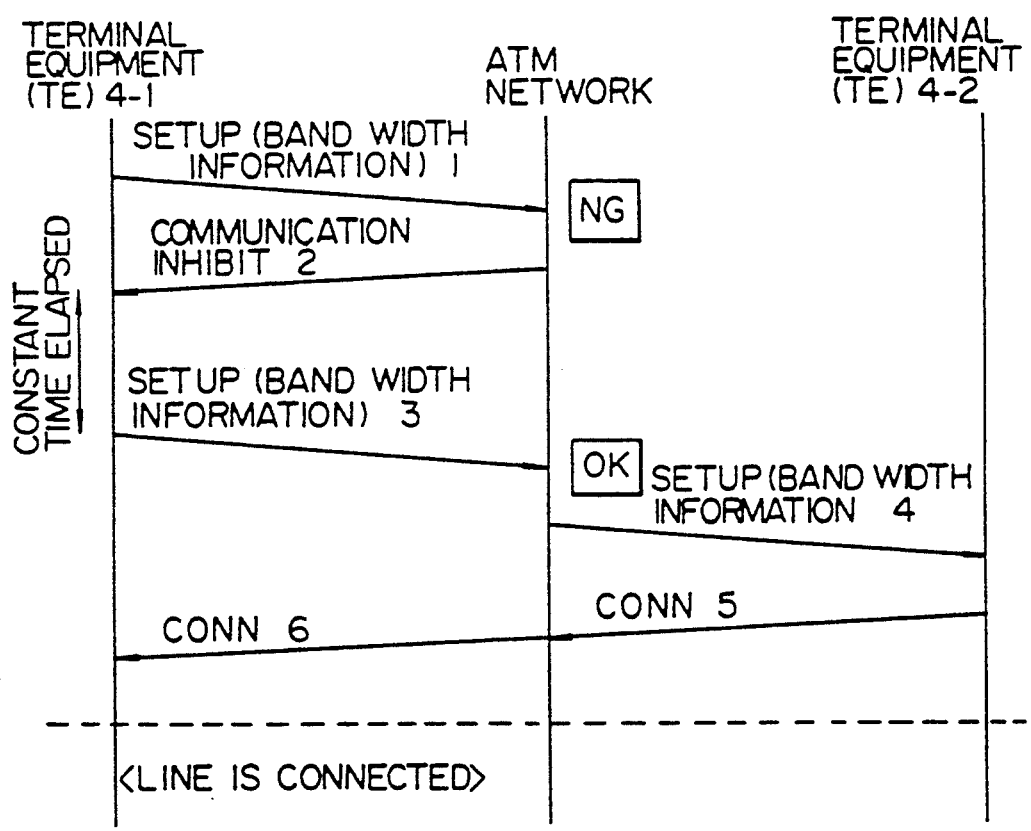
FIG. 3 ia a view of the processing sequence of a conventional call setup.

FIG. 3 is a view of the processing sequence of a conventional call setup. In general, the terminal equipment 4-1 and 4-2 used in VBR communication can recognize the available bandwidth in advance according to the content of the transmission and notifies the ATM switching network of the information of the bandwidth to be used for the call setup (maximum value, mean value, etc.) As opposed to this, the ATM switching network obtains a grasp of the current state of traffic and judges if the bandwidth requested by the terminal equipment can be allowed. The ATM switching network handles input information from various types of terminal equipment and lines, so when the bandwidth requested by a certain terminal equipment exceeds the allocable bandwidth, judges that communication is not possible (NG) and notifies the terminal equipment 4-1 making the request that communication is prohibited ([2]).

Receiving this, the terminal equipment 4-1 notifies the network of the information of the bandwidth to be used (maximum value, mean value, etc.) once again after a certain period ([3]).

When the requested bandwidth is within the allocable bandwidth of the network, the network judges that communication is possible (OK) and sends a call setup (SETUP) message to the terminal equipment 4-2 of the other party ([4]).

The terminal equipment 4-2 judges whether to receive this communication and if in a state to receive it, sends a connection (CONN) message to the terminal equipment 4-1 ([5] and [6]). If it cannot receive it, it sends a disconnection (DISC) message.

The above routine is used for connection of the line and communication.

Figure 4:
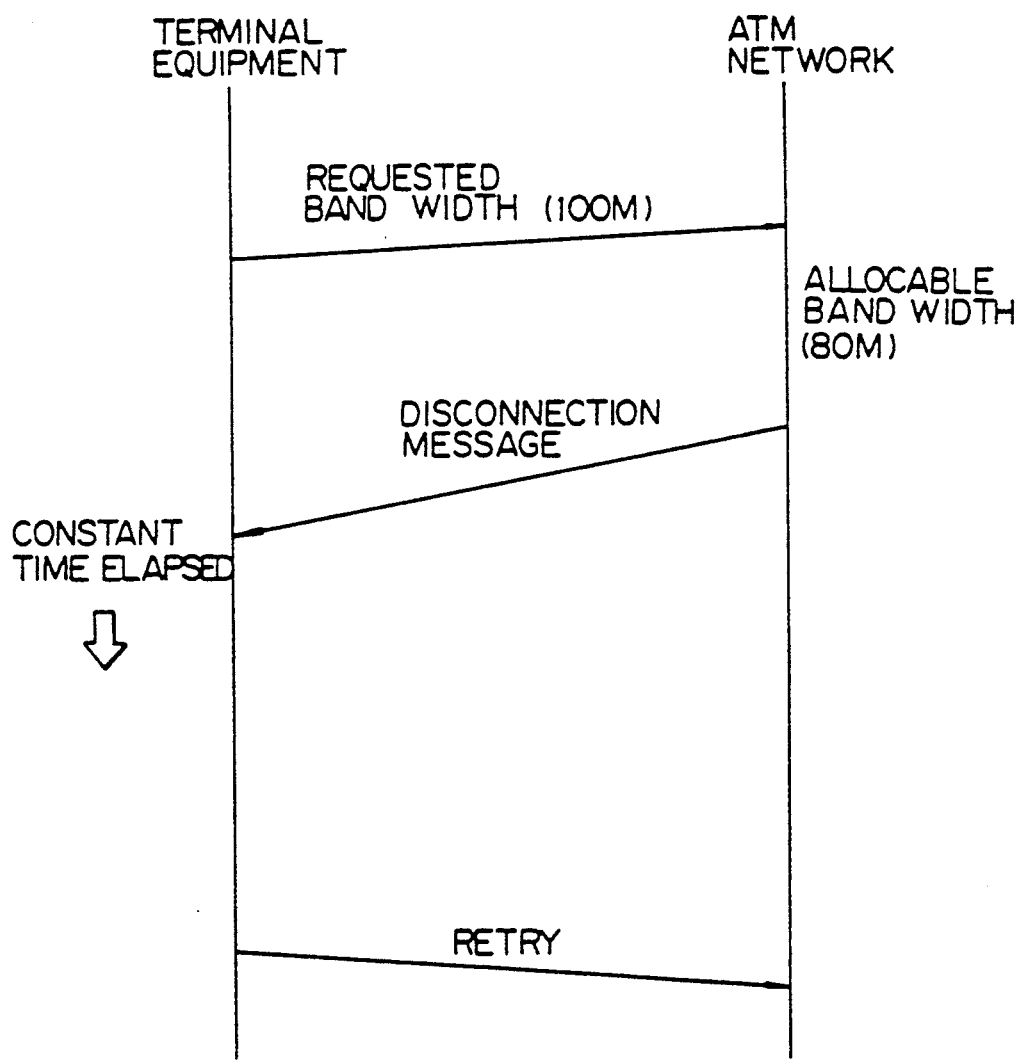
FIG. 4 is a view of the sequence emphasizing the defects in the conventional call setup processing.

FIG. 4 is a view of the sequence emphasizing the defects in the conventional call setup processing. It shows in a simple manner the causes behind the problems mentioned earlier. That is, in the figure, if the bandwidth requested by the terminal equipment is larger than the allocable bandwidth in the ATM network, the call is immediately disconnected. The terminal equipment retries after a while and succeeds in connection with the ATM switching network when the allocable bandwidth is larger than the requested bandwidth.

Next, an explanation will be made of the present invention, which can solve the above problems in the conventional art. First, the processing sequence of the present invention will be simply shown compared with the above FIG. 3.

Figure 5:
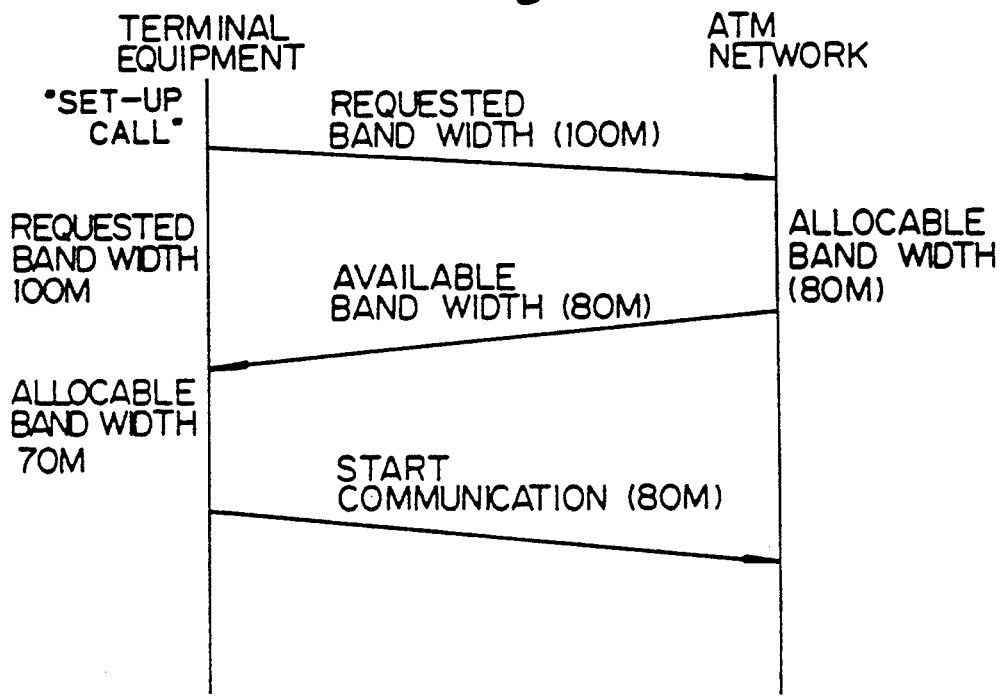
FIG. 5 is a view simply showing the control sequence (during call setup) under the present invention.
Figure 6:
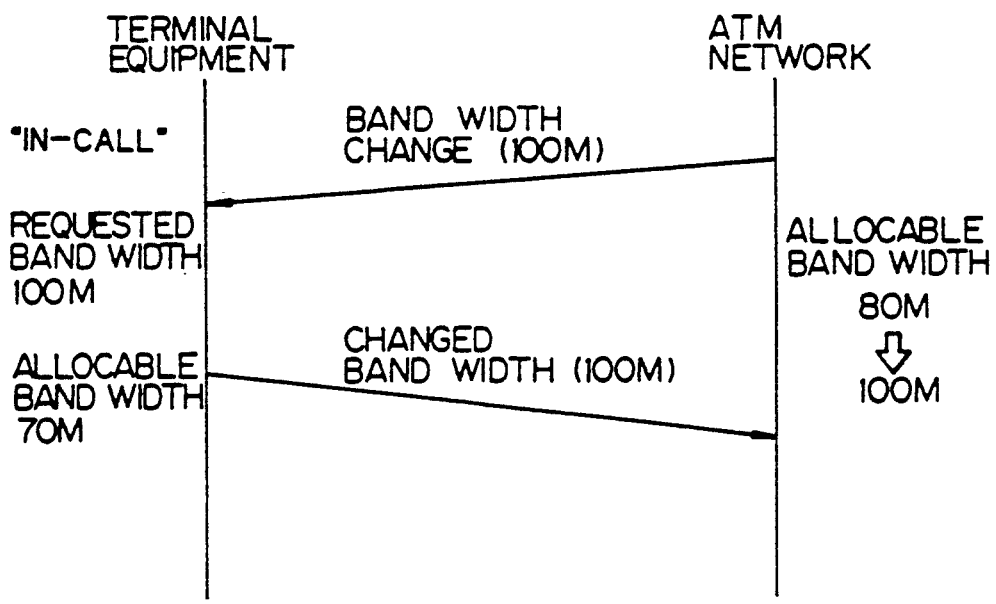
FIG. 6 is a view simply showing the control sequence (in-call) under the present invention.

FIG. 5 is a view simply showing the control sequence (during call setup) under the present invention, and FIG. 6 is a view simply showing the control sequence (in-call) under the present invention. The point in FIG. 5 is that when the communication bandwidth requested by the terminal equipment is larger than the allocable bandwidth of the ATM switching network, the requested communication bandwidth is reduced to the allocable bandwidth and communication then started.

Further, the point in FIG. 6 is that during call setup, even if the terminal equipment has started communication at a reduced communication bandwidth than originally requested, if the allocable bandwidth of the ATM switching network subsequently increases during the call, the communication can be continued while increasing the bandwidth to the one requested.

Figure 7:
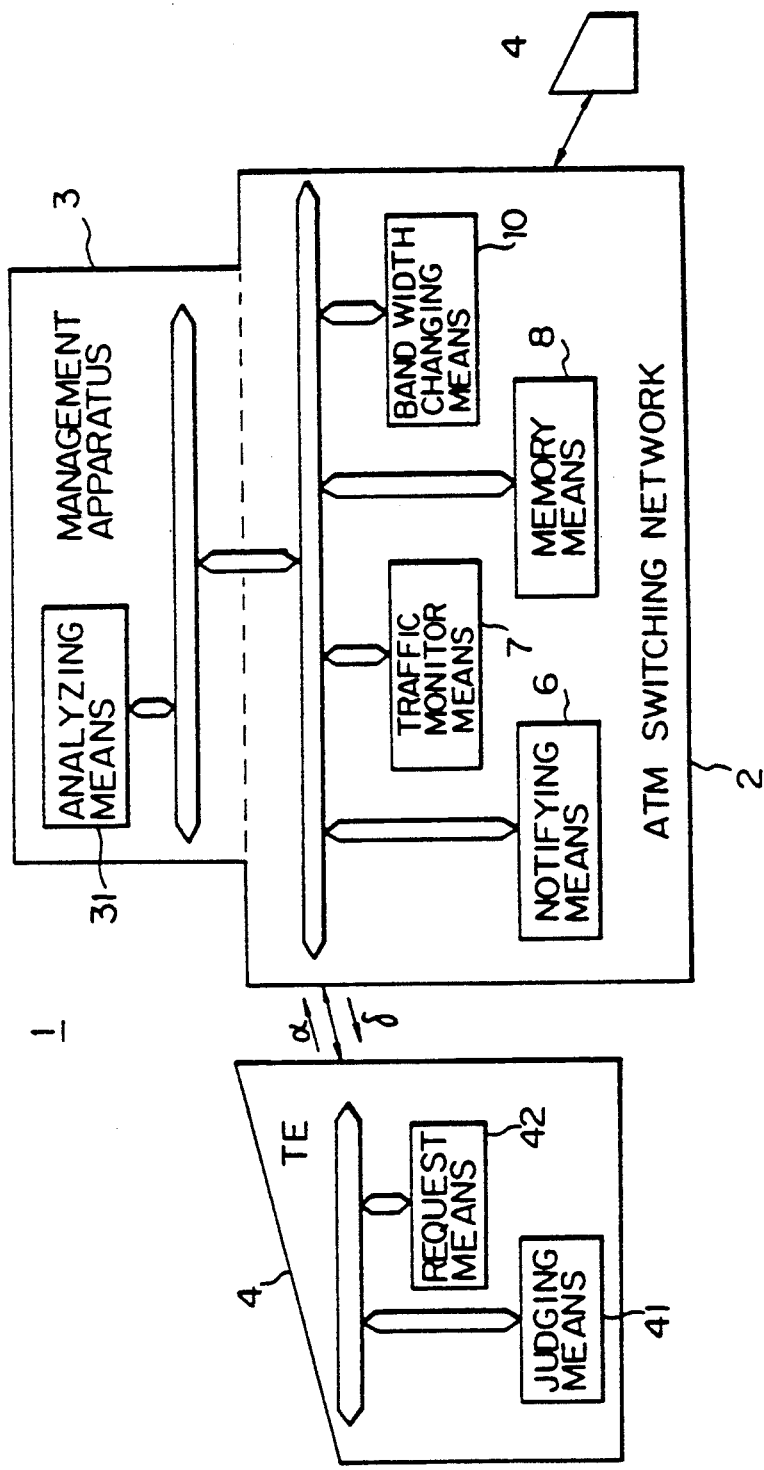
FIG. 7 is a view showing the basic constitution of a system based on the present invention.

FIG. 7 is a view showing the basic constitution of a system based on the present invention. The ATM switching network communication system 1 of the present invention includes an ATM switching network 2 which includes a plurality of ATM exchanges 5 (not shown in FIG. 7, but shown in FIG. 8) and controls exchanges among a plurality of terminal equipment 4 and a management apparatus 3 which manages the traffic in the ATM switching network 2; the ATM switching network 2 includes a notifying means 6 which notifies the terminal equipment 4 of the allocable bandwidth 6 which can be used in accordance with the amount of traffic in the ATM switching network. When the notified allocable bandwidth is a bandwidth which can be used for their communication, the terminal equipment 4 start the communication in the range of that bandwidth.

The ATM switching network 2 includes a traffic monitoring means 7 which monitors the amount of traffic in the ATM switching network.

The management apparatus 3 includes an analyzing means 31 which analyzes the allocable bandwidth which can be given to the terminal equipment 4 in accordance with the amount of traffic.

The terminal equipment 4 include judgement means 41 which judge whether the allocable bandwidth $\delta$ notified from the ATM switching network 2 is a bandwidth of a size allowable for their own communication.

The terminal equipment 4 include request means 42 which request to the ATM switching network 2 the communication bandwidth $\alpha$ required for their own communication.

The ATM switching network 2 includes memory means 8 which store the communication bandwidth $\alpha$ requested by the terminal equipment and required for the communication of the terminal equipment 4. Further, it includes a bandwidth changing means 10 which changes the bandwidth to a communication bandwidth stored in the memory means 8 when the allocable bandwidth 6 expands to larger than that communication bandwidth during a call of the terminal equipment 4.

Figure 8B:
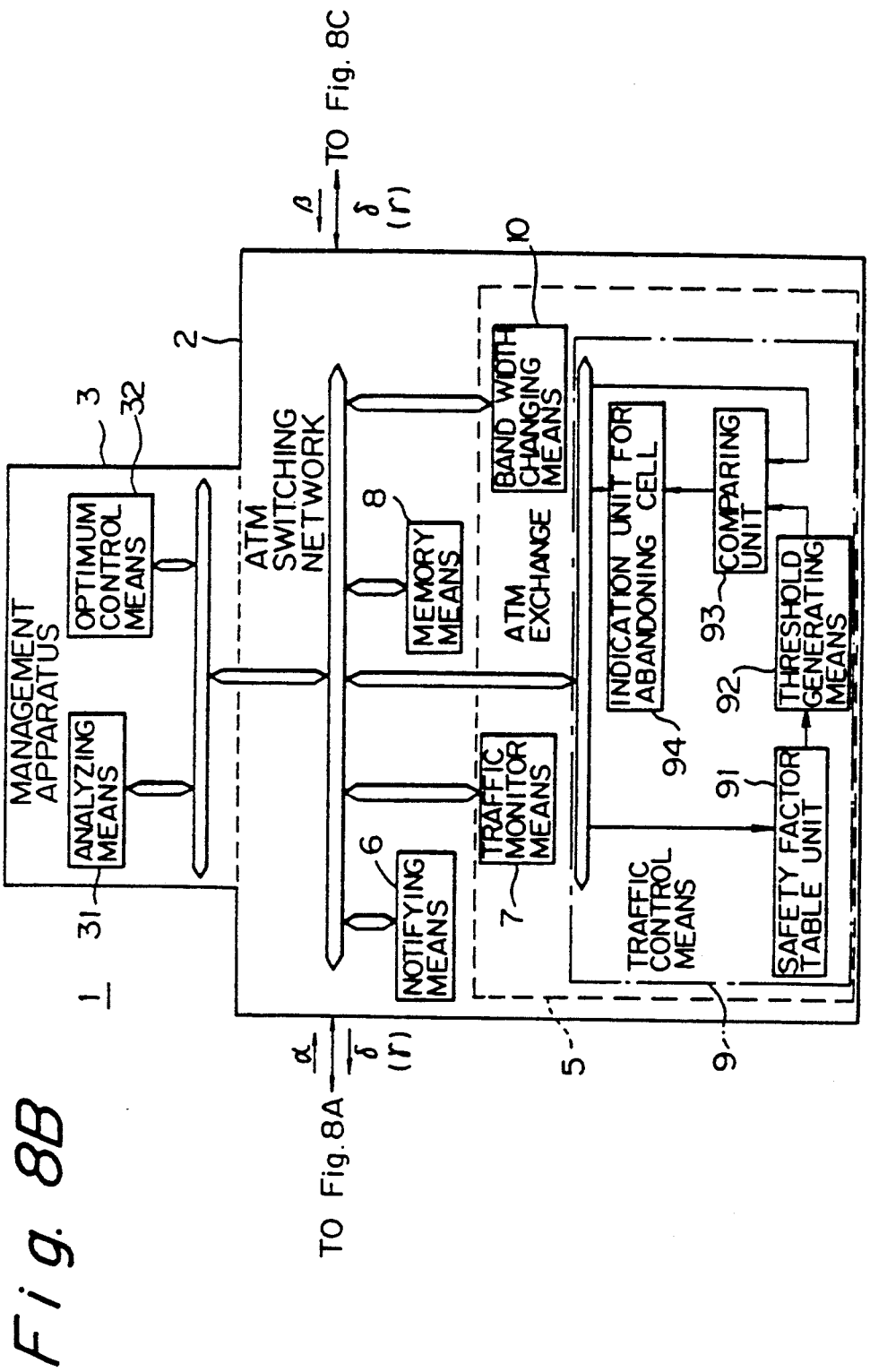

FIG. 8A, FIG. 8B, and FIG. 8C are views showing the basic constitution of the system based on the present invention based on the state where two pieces of terminal equipment are further incorporated for mutual communication. In the figures, the ATM communication system 1 is provided with an ATM switching network 2 which includes a plurality of ATM exchanges 5 and controls exchanges among a plurality of terminal equipment 4 and a management apparatus 3 which manages the traffic in the ATM switching network 2.

A first terminal equipment 4-1 and a second terminal equipment 4-2 which can communicate with each other have included in them a first request means 42-1 and a second request means 42-2 which request a first communication bandwidth $\alpha$ and a second communication bandwidth $\beta$ which they require to the ATM switching network side.

The ATM switching network 2 includes a traffic monitoring means 7 which monitors the amount of traffic in the ATM switching network. The management apparatus 3 includes an analyzing means 31 which analyzes the allocable bandwidth $\delta$ which can be given to the first and second terminal equipment 4-1 and 4-2 in accordance with the amount of traffic from the traffic monitoring means 7.

The first and second terminal equipment 4-1 and 4-2 respectively send out the first and second communication bandwidths $\alpha$ and $\beta$ to the ATM switching network 2 from the first and second request means 42-1 and 42-2.

The analyzing means 31 in the management apparatus 3 decides on a common available bandwidth $\delta$ for the first and second terminal equipment 4-1 and 4-2 based on the first and second communication bandwidths $\alpha$ and $\beta$ received through the ATM switching network 2 and the amount of traffic monitored by the traffic monitoring means 7. The available bandwidth decided on is notified to the first and second terminal equipment 4-1 and 4-2 through a notifying means 6 provided in the ATM switching network 2.

The first and second communication bandwidths $\alpha$ and $\beta$ are the maximum bandwidths expected to be necessary for the communication by the first and second terminal equipment 4-1 and 4-2. Alternatively, the first and second communication bandwidths $\alpha$ and $\beta$ are the mean values of the bandwidths expected to be necessary for the communication by the first and second terminal equipment 4-1 and 4-2.

The ATM switching network 2 includes a memory means 8 which stores the first and second communication bandwidths $\alpha$ and $\beta$ requested from the first and second terminal equipment 4-1 and 4-2 at the start of communication between the terminal equipment. Further, the analyzing means 31 includes a bandwidth changing means 10 which notifies the first and second terminal equipment 4-1 and 4-2 of a changed bandwidth comprising the current first and second communication bandwidths $\alpha$ and $\beta$ expanded to a new allocable bandwidth when judging during communication between the first and second terminal equipment 4-1 and 4-2 that the allocable bandwidth $\delta$ has expanded to the first and second communication bandwidths $\alpha$ and $\beta$ stored in the memory means 8.

The first and second terminal equipment 4-1 and 4-2 include a first memory means 43-1 and a second memory means 43-2 which store respectively the first and second communication bandwidth $\alpha$ and $\beta$ requested to the ATM switching network 2 by them at the time of the start of communication.

The first and second terminal equipment 4-1 and 4-2 include a first decision means 44-1 and a second decision means 44-2 which decide whether to start communication by the available bandwidth commanded from the ATM switching network 2.

The traffic monitoring means 7 is provided in the ATM exchanges 5 of the ATM switching network 2.

The management apparatus 3 is provided with an optimal control means 32 which produces optimal traffic control information based on the results of analysis by the analyzing means 31 and supplies the information to the ATM switching network 2.

A traffic control means 9 which receives the optimal traffic control information supplied from the optimal control means 22 and performs the control of the traffic is provided in the ATM exchange 5.

A bandwidth changing means 10 which notifies the first and second terminal equipment 4-1 and 4-2 that the present available bandwidth allocated for the communication between the two will be changed based on the optimal traffic control information is provided in the ATM exchanges 5.

The traffic control means 9 in the ATM exchanges 5 has a safety factor table unit 91 which sets in advance the safety factor showing the range of allowance of fluctuations in the amount of traffic for each of the communication media (V, D, and P in FIG. 1) which the first and second terminal equipment 4-1 and 4-2 handle and stores the set safety factors as a table; a threshold generating unit 92 which generates a threshold value obtained by multiplying the available bandwidths by the corresponding safety factors for each of the communication media; a comparing unit 93 which compares the amount of traffic obtained by the traffic monitoring means 7 and the threshold value obtained from the threshold generating unit 92; and a cell abandonment indicating unit 94 which sends out a command for abandoning a communication cell between the first and second terminal equipment 4-1 and 4-2 in the ATM exchanges 5 when the result of the comparison by the comparing unit 93 is that the amount of traffic has exceeded the threshold value.

The first and second terminal equipment 4-1 and 4-2 include media classification notifying means 45-1 and 45-2 which notify the classification of the communication media to the traffic control means 5.

Figure 9:
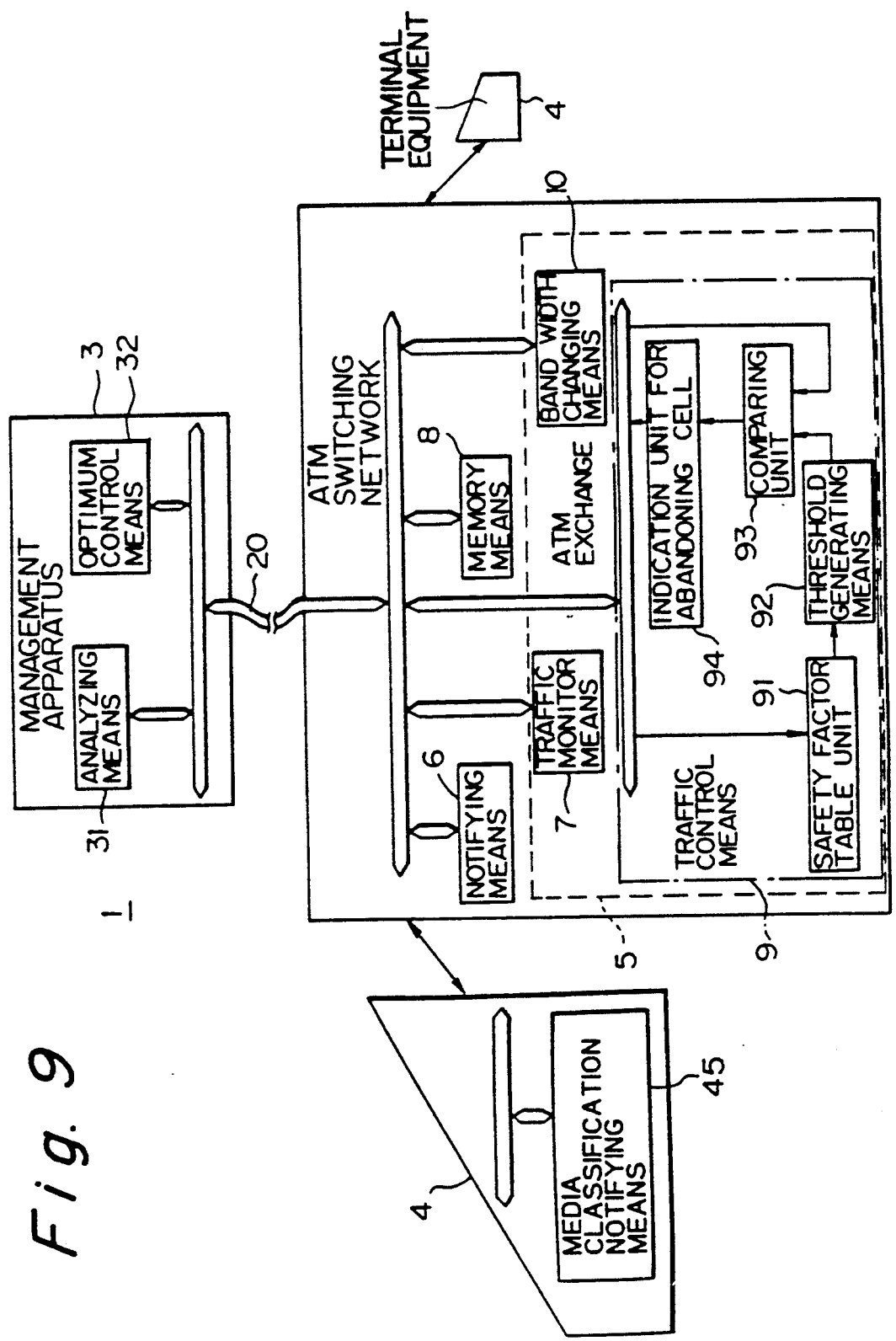
FIG. 9 is a view of an example of the architecture of a system according to the present invention.

FIG. 9 is a view of an example of the architecture of a system according to the present invention. Note that throughout the figures, elements of similar structures are indicated by the same reference numerals or symbols. One of the points of this figure is the provision of the communication line for transfer information on the traffic transferred between the management apparatus 3 and the ATM exchange 2. The construction of FIG. 9 will be explained in more detail later.

The basic operation performed in the ATM communication system in the present invention consists of the following steps:

Step 1

When communication is to be performed between the first terminal equipment 4-1 and the second terminal equipment 4-2, the first communication bandwidth $\alpha$ required for the communication is sent through the first request means 42-1 in the first terminal equipment on the originating side to the ATM switching network 2 at the start of the communication.

Step 2

The ATM switching network 2 side monitors the amount of traffic in the ATM switching network 2, analyzes the bandwidth allocable to the terminal equipment in the ATM switching network 2, and, when receiving the first communication bandwidth $\alpha$ from the originating side first terminal equipment 4-1, sends the received first communication bandwidth $\alpha$ together with the allocable bandwidth $\delta$ to the terminating side second terminal equipment 4-2.

Step 3

The second terminal equipment 4-2, when receiving the allocable bandwidth $\delta$ and the first communication bandwidth $\alpha$, sends the second communication bandwidth $\beta$ which the second terminal equipment 4-2 requests for communication, through the second request means 42-2 in the equipment to the ATM switching network 2 side.

Step 4

The ATM switching network 2 decides on the available bandwidth to be commonly occupied by the first and second terminal equipment 4-1 and 4-2 based on the first and second communication bandwidths ($\alpha$ and $\beta$) and the allocable bandwidth 6.

Step 5

The decided on available bandwidth $\delta$ is sent from the ATM switching network 2 side to the first and second terminal equipment 4-1 and 4-2.

The above-mentioned basic operation preferably includes the following steps:

Step I

The first and second communication bandwidths ($\alpha$ and $\beta$) sent from the first and second terminal equipment 4-1 and 4-2 at the start of the communication are stored at the ATM switching network 2 side.

Step II

The first and second terminal equipment decide by their decision means 44-1 and 44-2 whether the available bandwidth $\delta$ decided on and notified by the ATM switching network can be received.

Step III

During the call between the first and second terminal equipment, the ATM switching network side detects if the allocable bandwidth $\delta$ exceeds the stored first and second communication bandwidths ($\alpha$ and $\beta$).

Step IV

When it detects that it exceeds the same, the ATM switching network side notifies the first and second terminal equipment side of the stored first and second communication bandwidths ($\alpha$ and $\beta$).

Step V

The first and second terminal equipment decide by their respective decision means 44-1 and 44-2 to change the presently used bandwidth.

Figure 10:
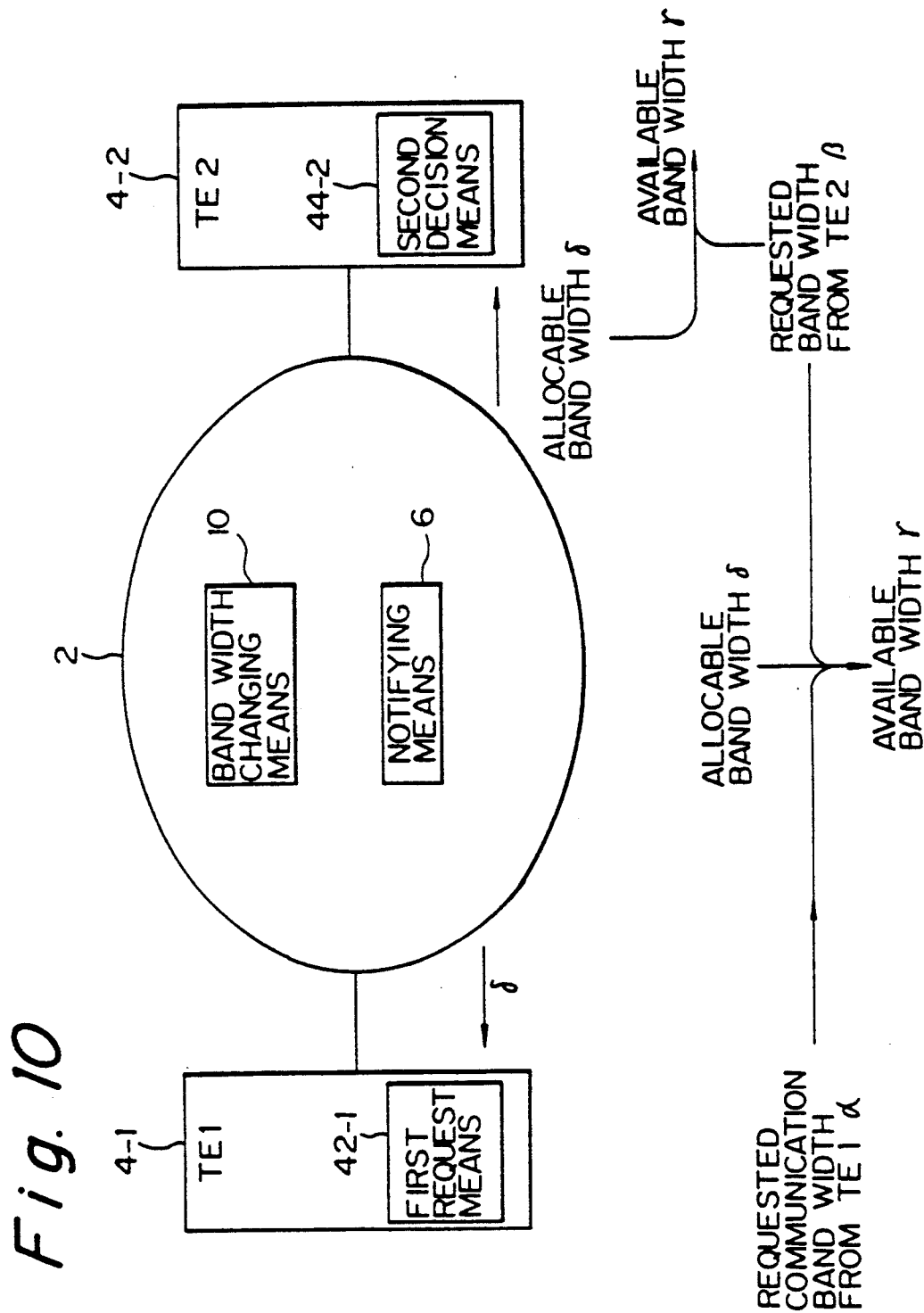
FIG. 10 is a view of the transfer of bandwidth information in the system shown in FIGS. 8A, 8B, and 8C.

FIG. 10 is a view of the transfer of bandwidth information in the system shown in FIGS. 8A, 8B, and 8C. In the figure, 4-1 and 4-2 are broadband (B) ISDN terminal equipment TE able to handle VBR communication and 2 is a B-ISDN ATM switching network Reference numeral 6 is a notifying means in the B-ISDN which decides on the available bandwidth information $\gamma$ to be used for the communication from received requested communication bandwidth information $\alpha$ and the allocable bandwidth information $\delta$ presently being provided.

Reference numeral 42-1 is a first request means which includes a means for monitoring the amount of the presently used bandwidth in the terminal equipment 4-1.

Reference numeral 44-2 is a decision means which decides on the available bandwidth information ($\gamma$) to be used for communication from the received available bandwidth $\gamma$ and the requested communication bandwidth $\beta$ of the terminal equipment in question.

Reference numeral 10 is a bandwidth changing means which recognizes the change in the state of the bandwidth in the ATM switching network 2 and sends the changed bandwidth amount to the terminal equipment 4-1 and 4-2.

A notifying means 6 designates and notifies the available bandwidth $\gamma$ between the originating side terminal equipment (TE) 4-1 and the terminating side terminal equipment (TE) 4-2 based on the communication bandwidth $\alpha$ requested from the originating side terminal equipment (TE) 4-1, the communication bandwidth $\beta$ requested from the terminating terminal equipment (TE) 4-2, and the allocable bandwidth $\delta$ grasped by the ATM switching network 2.

The ATM switching network 2 is provided with a bandwidth changing means 10 which monitors the amount of traffic in communication and notifies a changed bandwidth when the state of the bandwidth changes. When there is a change in the communication bandwidth grasped by the ATM switching network 2 side during a call between the originating terminal equipment (TE) 4-1 and the terminating terminal equipment (TE) 4-2 through the ATM switching network 2, the bandwidth changing means 10 notifies the change of the communication bandwidth to the originating terminal equipment (TE) 4-1 and the terminating terminal equipment (TE) 4-2.

Further, the originating terminal equipment (TE) 4-1 is provided with a request means 42-1 which monitors the presently used bandwidth amount. The originating terminal equipment (TE) 4-1 superposes the maximum value of the bandwidth used as $\alpha$ on the call setup signal by the means 42-1 and sends it to the ATM switching network 2.

Further, the terminating terminal equipment (TE) 4-2 is provided with a decision means 44-2 which decides on the available bandwidth $\delta$ to be used for communication from the received allocable bandwidth $\delta$ and the communication bandwidth $\beta$ which that terminal equipment itself requested. When it receives an allocable bandwidth $\delta$ from the ATM switching network 2, it decides, by the decision means 44-2, on the available bandwidth $\gamma$ to be used for communication from the communication bandwidth $\beta$ which that terminal equipment itself had requested.

In the present invention, at the call setup, the terminal equipment (TE) 4-1 sends out the maximum bandwidth to be used for communication to the ATM switching network 2 as the requested communication bandwidth $\alpha$. The ATM switching network 2 receives the communication bandwidth $\alpha$, compares the allocable bandwidth $\delta$ which can be presently provided for the communication, and decides on the available bandwidth $\gamma$. The other terminal equipment (TE) 4-2 receives the available bandwidth $\gamma$, compares it with the communication bandwidth $\beta$ requested by the terminal equipment itself, and decides on the available bandwidth $\gamma$.

Further, even during communication, the ATM switching network 2 sends out the bandwidth change to the two terminal equipment (TE) 4-1 and 4-2 each time there is a change in the bandwidth state. Therefore, it is possible to change the communication bandwidth between the terminal equipment 4-1 and 4-2 commensurate with the changes in the bandwidth at the ATM switching network 2 side.

Figure 11:
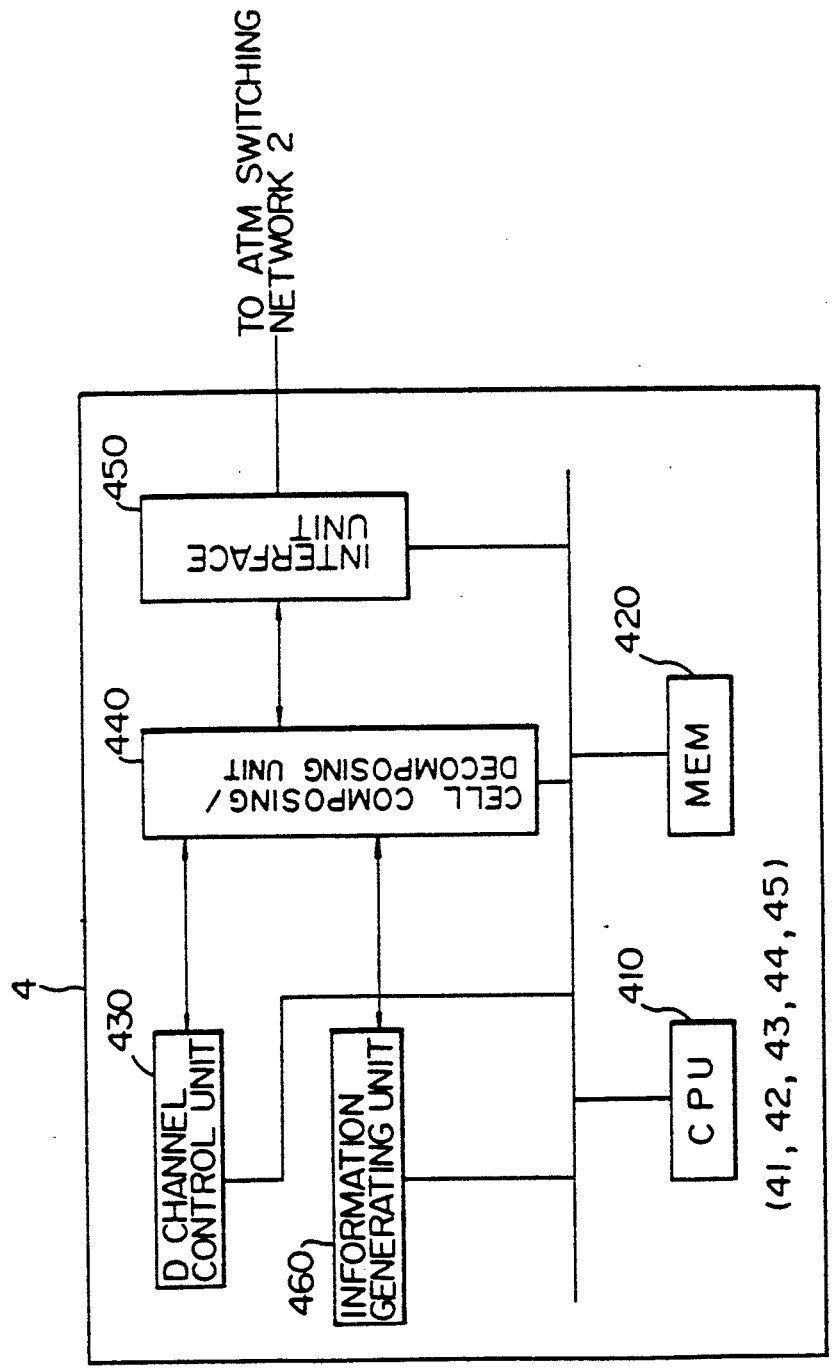
FIG. 11 is a view of the constitution of an embodiment of a terminal equipment.

FIG. 11 is a view of the constitution of an embodiment of a terminal equipment. In the figure, a central processing unit (CPU) 40 and a memory (MEM) 420 cooperating with the same form the above-mentioned judging means 41, request means 42, memory means 43, decision means 44, and media classification notifying means 45.

In FIG. 11, the information data from an information generating unit 460 and control information from a D-channel control unit 430 are packed into a packet called a cell by a cell composing/decomposing unit 440 and are sent through an interface unit 450 to the ATM switching network 2. The CPU 410 recognizes the present amount of cell transmission while monitoring the cell composing/decomposing unit 440 at all times, and sends out the communication bandwidths ($\alpha$ and $\beta$) requested to the ATM switching network 2 at the time of communication.

Figure 12:
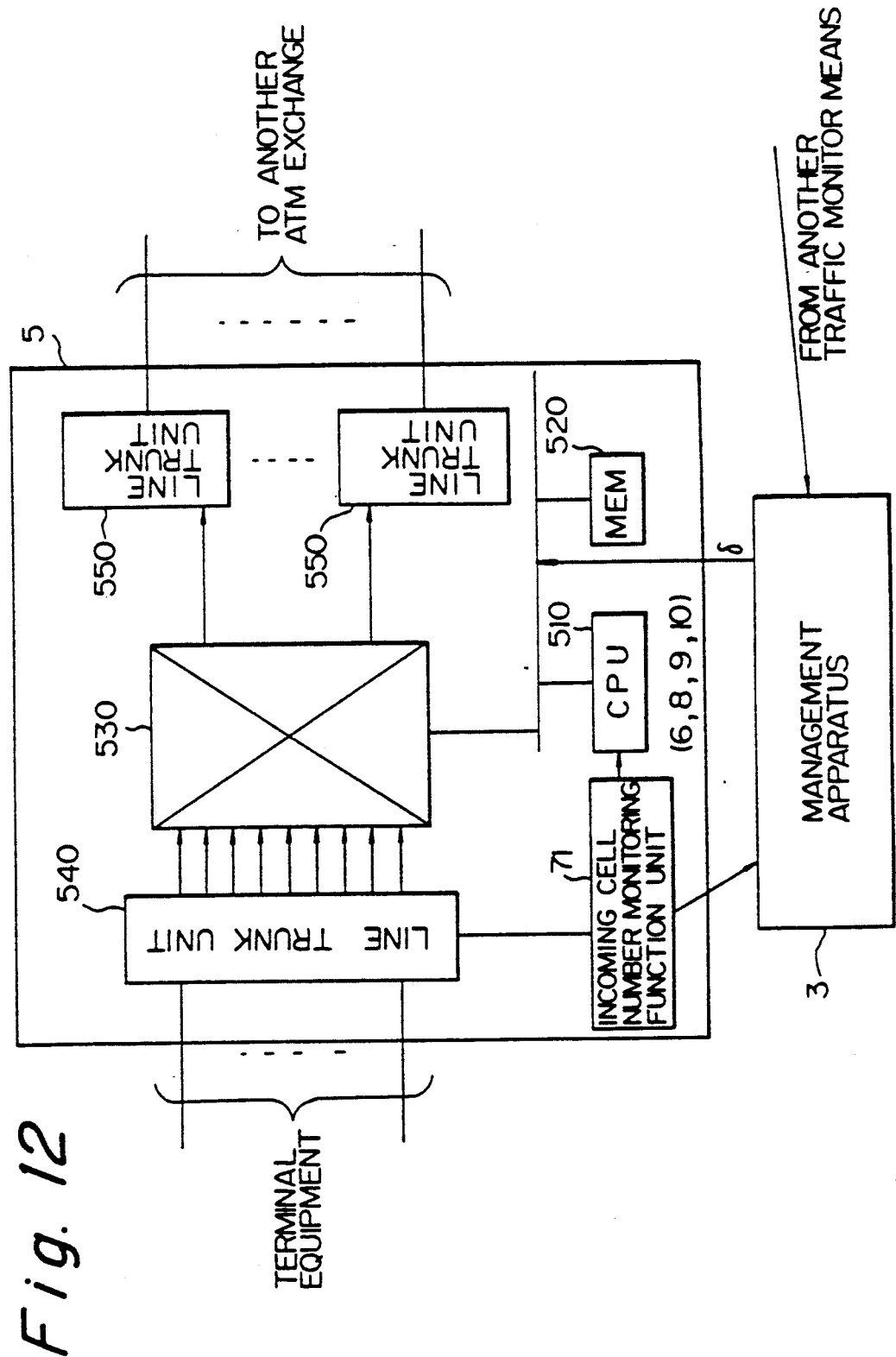
FIG. 12 is a view of the constitution of an embodiment of an ATM exchange.

FIG. 12 is a view of the constitution of an embodiment of an ATM exchange. In the figure, a CPU 510 and a memory 520 which cooperates with the same form the above-mentioned notifying means 6, memory means 8, traffic control means 9, and bandwidth changing means 10.

In general, an ATM switching network (ISDN) includes a large number of the ATM exchanges 5 shown in FIG. 12. In the figure, 540 is a line trunk unit which accommodates lines from the terminal equipment 4, 530 is an ATM exchanging function unit which multiplexes the cells and outputs them to the destination line, and 550 is a line trunk unit which accommodates connected lines among the exchanges. Reference numeral 3 is the above-mentioned management apparatus, which is linked with an incoming cell number monitoring function unit 71 (corresponding to traffic monitoring means 7).

The communication bandwidth $\alpha$ placed on the call setup message from the terminal equipment 4 is received by the line trunk unit 540. Then, the incoming cell number monitoring function unit 71 which monitors the current amount of traffic at all times sends the requested communication bandwidth $\alpha$ to the management apparatus 3. The management apparatus 3 receives the allocable bandwidth from the incoming cell number monitoring function unit 71 provided for each ATM exchange 5. The cells from the terminal equipment in the communication state are switched by the ATM exchanging function unit 530, multiplexed for every destination line, asynchronously sent through the line trunk unit 550 to the other ATM exchange, and connected to the terminal equipment 4-2 at the other communication party.

Figure 13B:
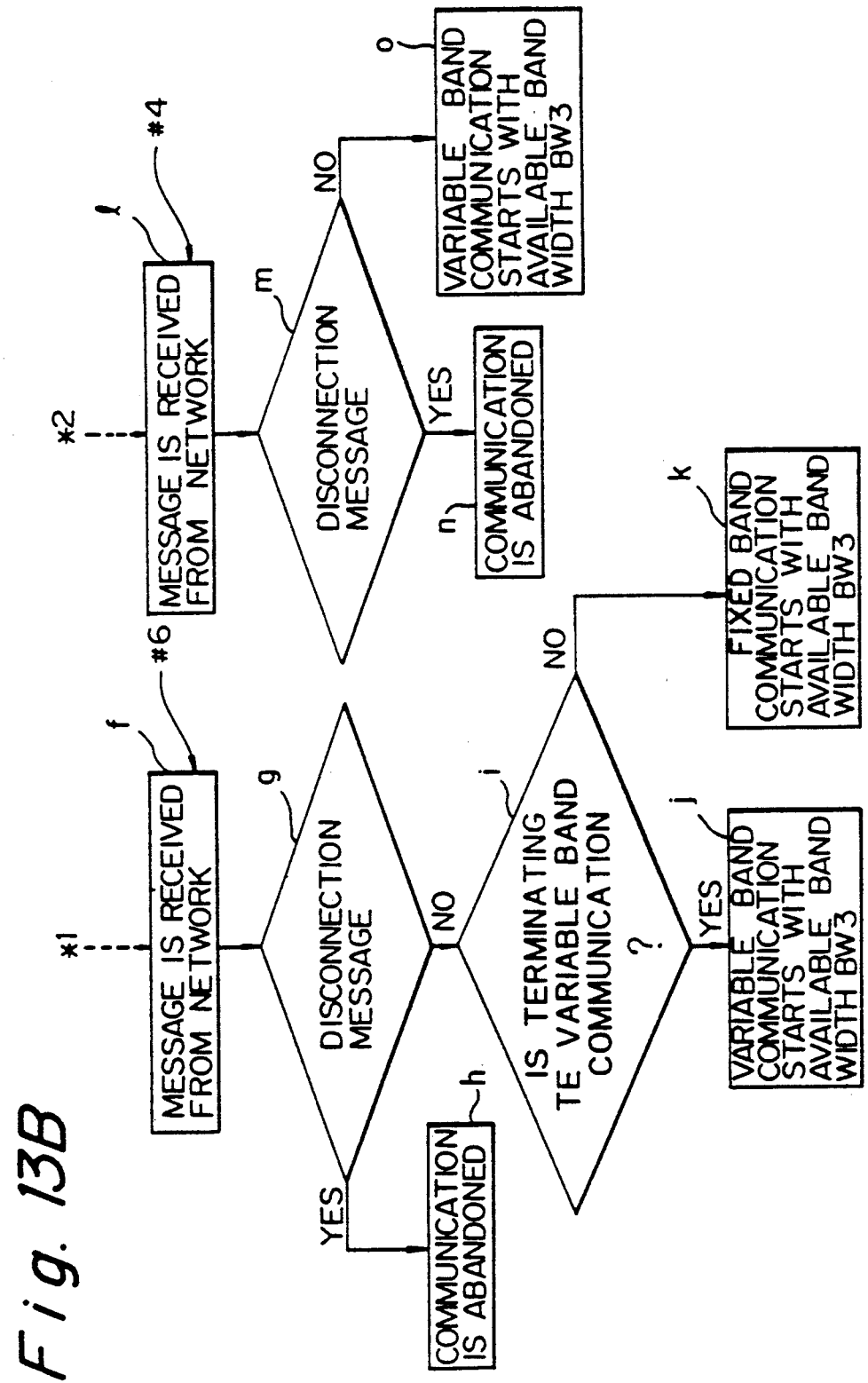
Figure 14A:
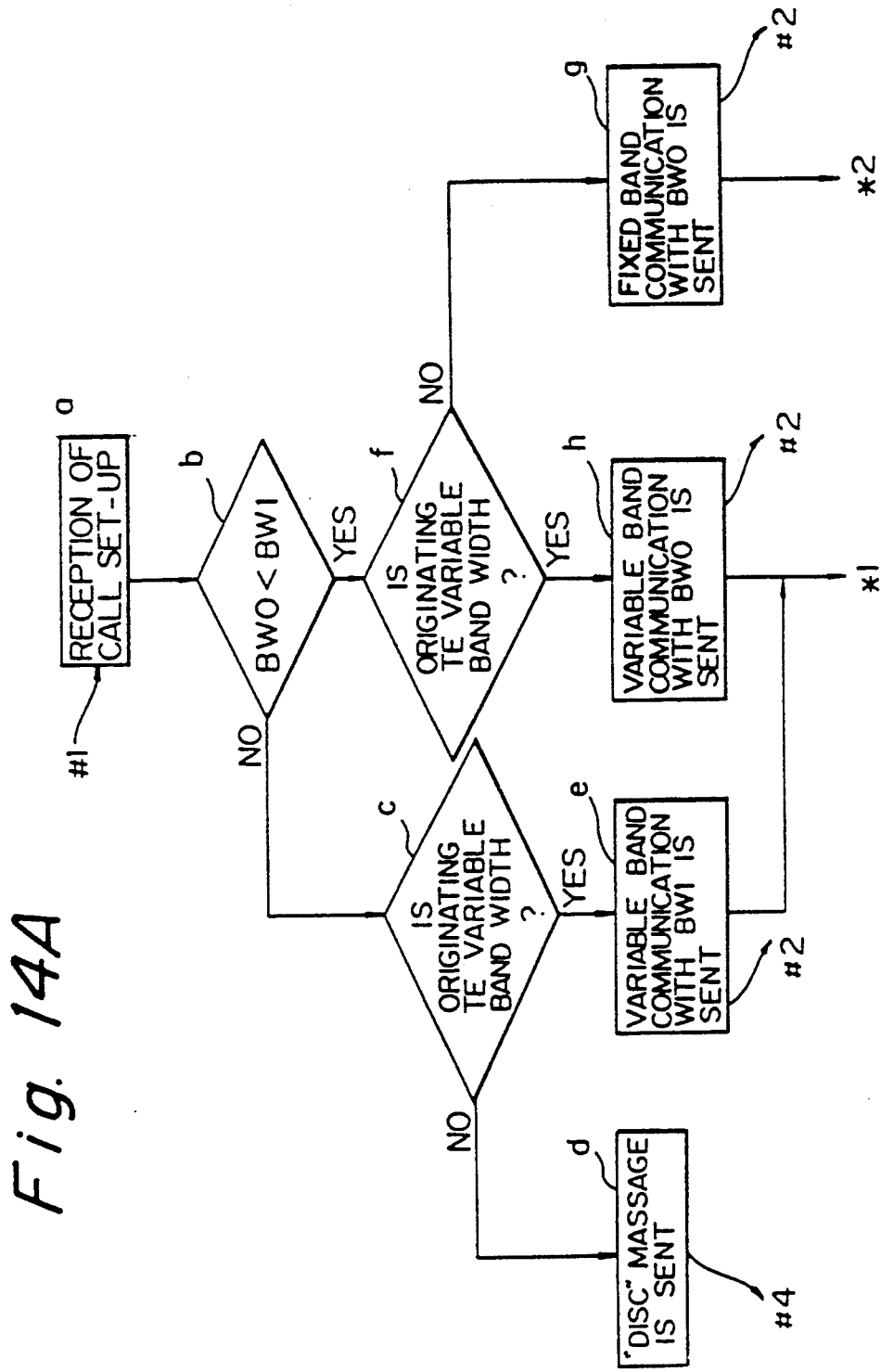
FIG. 14A and FIG. 14B are views showing the processing flow during call setup of a ATM switching network.
Figure 14B:
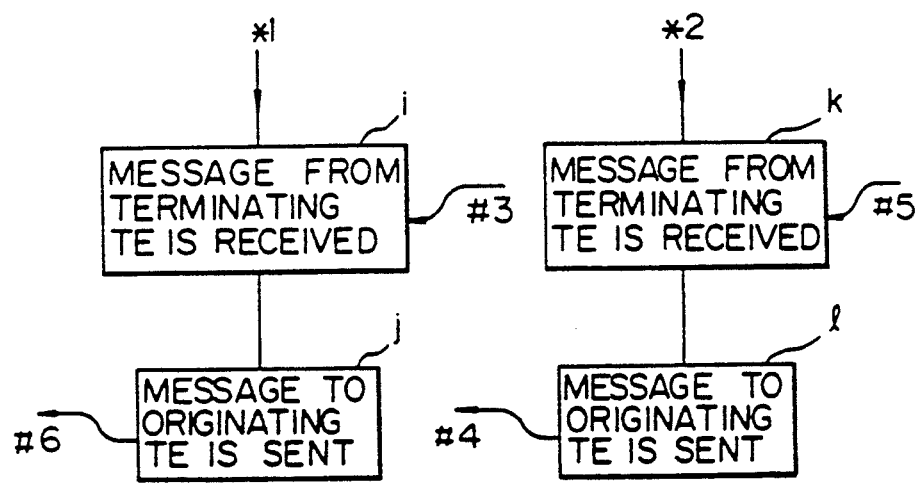
Figure 15A:
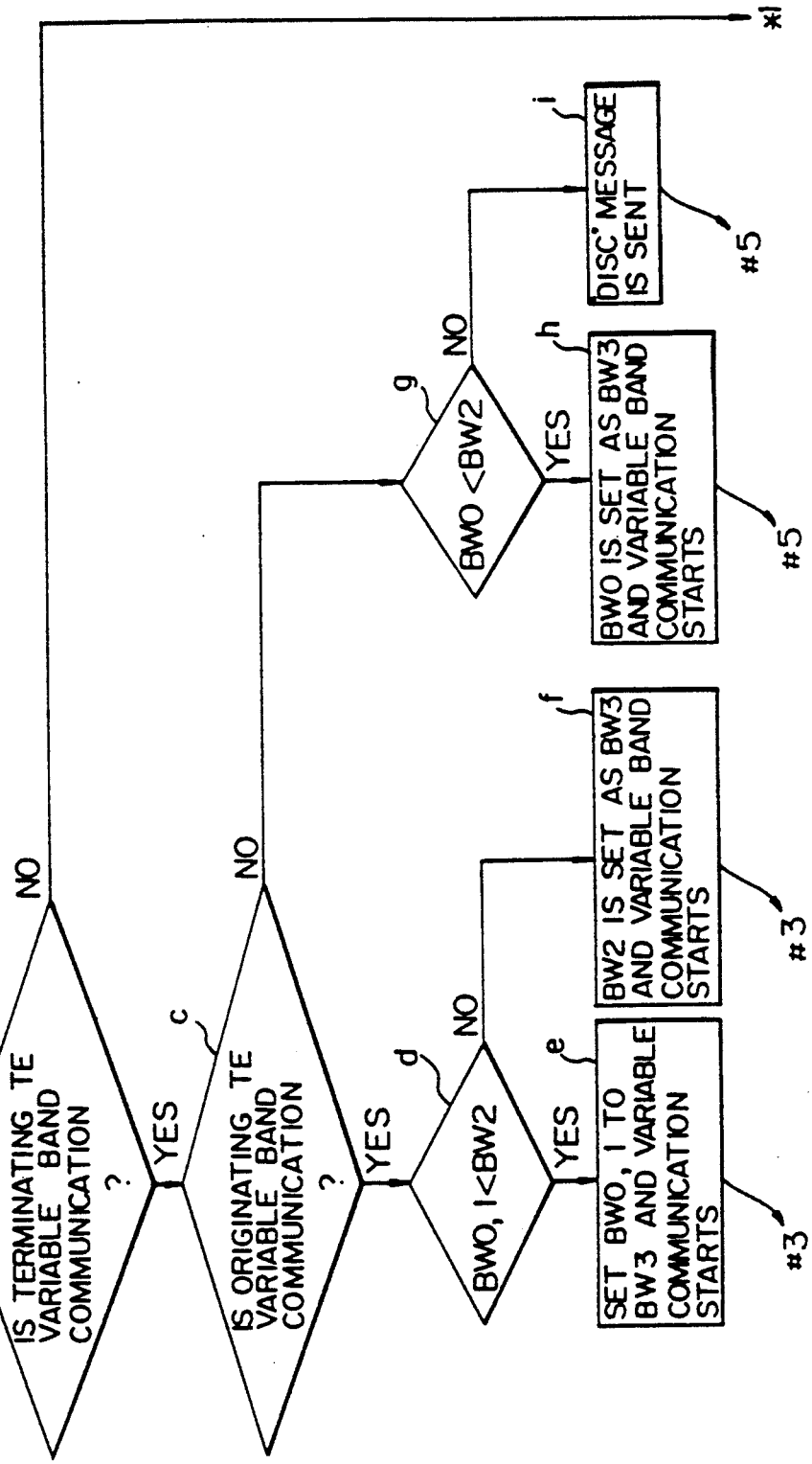
FIG. 15A and FIG. 15B are views showing the processing flow during call setup of a terminating terminal equipment.
Figure 15B:
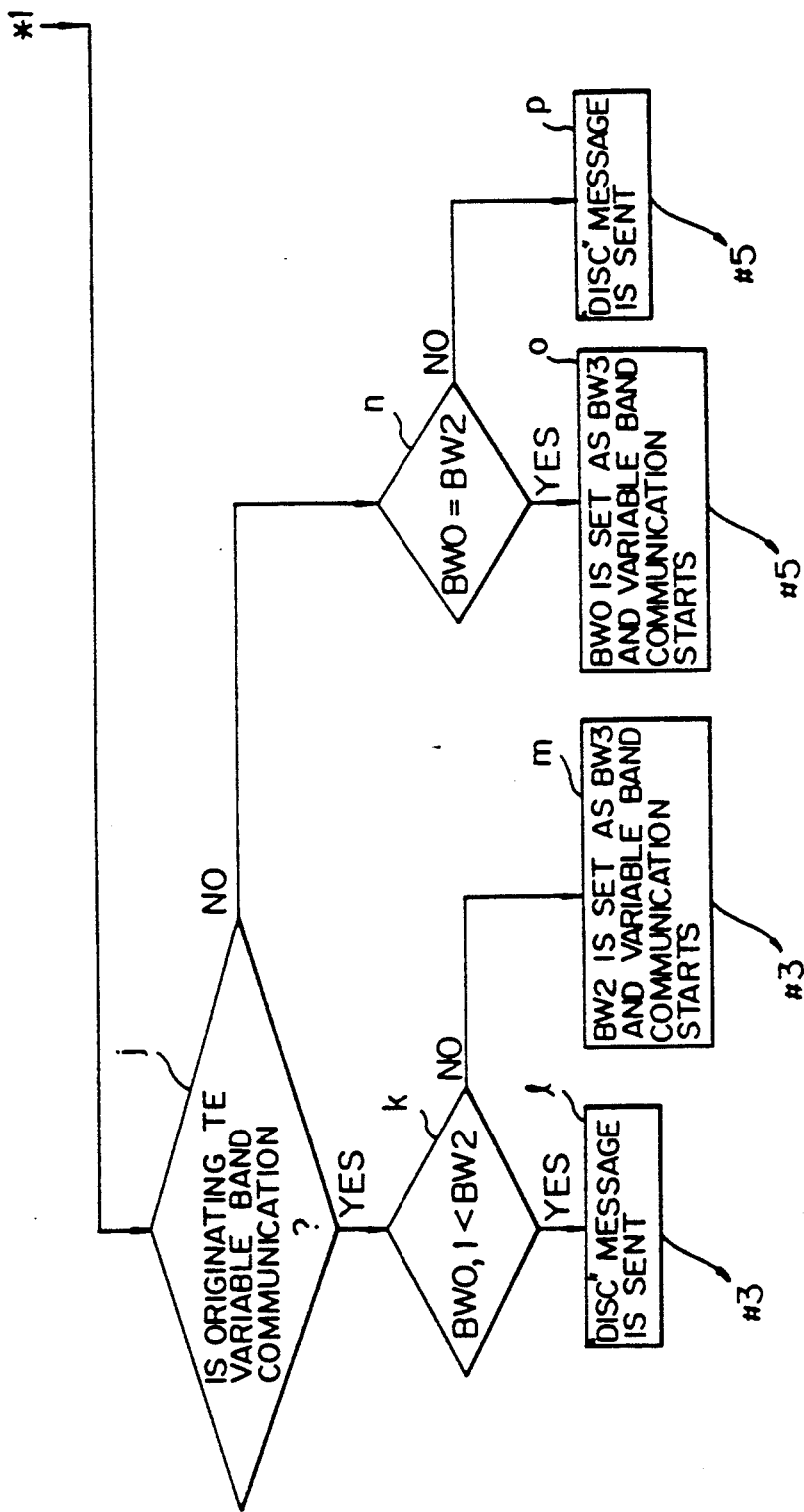

FIG. 13A and FIG. 13B are views showing the processing flow during call setup of an originating terminal equipment; FIG. 14A and FIG. 14B are views showing the processing flow during call setup of a network 2; and FIG. 15A and FIG. 15B are views showing the processing flow during call setup of a terminating terminal equipment. The # marks in the figures show the inputs and outputs among terminal equipment. Below, an explanation will be made of the flow of processing during call setup.

In FIG. 13A, the originating terminal equipment 4-1, when transmission information is generated, decides whether to perform communication based on VBR communication and by fixed band communication or to perform communication based on VBR communication and by variable band communication (step a). When performing fixed band communication (NO in step a), it sets the requested bandwidth information BW0 to be fixed (step b). Then, it places this in the call setup (SETUP) message and sends it to #1 of the ATM switching network 2 (step c).

When performing variable band communication (YES in step b), it designates a predetermined available bandwidth (for example, the maximum value) as the requested communication bandwidth BW0 (step d) according to the type of the information sent (for example, voice, data, moving picture), places it in the call setup (SETUP) message, and sends it to #1 of the ATM switching network 2 (step e).

In FIG. 14A, the ATM switching network 2, when receiving the call setup (SETUP) message from the originating terminal equipment 4-1 (step a), compares the requested communication bandwidth BW0 with the allocable bandwidth BW1, that is, the bandwidth which the ATM switching network 2 can allocate (step b).

When the requested communication bandwidth BW0 is larger than the allocable bandwidth BW1 and the originating terminal equipment is requesting fixed band communication (NO at step c), communication is not allowed, so a disconnection (DISC) message indicating reception is not possible is returned to #4 of the terminal equipment 4-1 (step d).

When the requested communication bandwidth BW0 is larger than the allocable bandwidth BW1 and the originating terminal equipment is requesting variable band communication (YES at step c), the allocable bandwidth BW1 is placed in the call setup (SETUP) message to the terminal equipment 4-1 of the other communication party and sent out (step e).

On the other hand, when the requested communication bandwidth BW0 is smaller than the allocable bandwidth BW1 and the originating terminal equipment 4-1 is requesting fixed band communication (NO at step f), the request for fixed band communication at the requested communication bandwidth BW0 is sent to the terminal equipment 4-2 of the other communication party (step g).

When the requested communication bandwidth BW0 is smaller than the allocable bandwidth BW1 and the originating terminal equipment 4-1 is requesting variable band communication (YES at step f), the requested communication bandwidth BW0 is made the requested communication bandwidth information and placed in the call setup (SETUP) message to the terminal equipment 4-2 of the other communication party for transmission to the same (step h).

In FIG. 15A and FIG. 15B, the terminating terminal equipment 4-2, when receiving a call setup (SETUP) message from the ATM switching network 2 (step d), decides whether or not to perform variable band communication or to perform fixed band communication (step b).

When both the originating terminal equipment 4-1 and the terminating terminal equipment 4-2 perform variable band communication (YES at step c), a comparison is made between the allocable bandwidth BW0 or BW1 from the ATM switching network 2 and the requested communication bandwidth BW2 of the terminating terminal equipment 4-2 (step d). Then, when the allocable bandwidth BW0 or BW1 is smaller than the requested communication bandwidth BW2 of the terminating terminal equipment (YES at step d), the allocable bandwidth BW0 or BW1 is decided on as the available bandwidth BW3 and a connection (CONN) message containing this BW3 is sent to #3 of the ATM switching network 2 (step e). On the other hand, when the allocable bandwidth BW0 or BW1 is larger than the requested communication bandwidth BW2 of the terminating terminal equipment 4-2 (NO at step d), the requested communication bandwidth BW2 is decided on as the available bandwidth BW3 and a connection (CONN) message containing this BW3 is sent to #3 of the ATM switching network 2 (step f).

When the originating terminal equipment 4-1 performs fixed band communication and the terminating terminal equipment 4-2 performs variable band communication (NO at step C), the allocable bandwidth BW0 and the requested communication bandwidth BW2 are compared (step g). Then, when the allocable bandwidth BW0 is smaller than the requested communication bandwidth BW2 of the terminating terminal equipment 4-2 (YES at step h), the allocable bandwidth BW0 is decided on as the available bandwidth BW3 and a connection (CONN) message containing this BW3 is sent to #5 of the ATM switching network 2 (step h). On the other hand, when the allocable bandwidth BW0 is larger than the requested communication bandwidth BW2 of the terminating terminal equipment 4-2 (NO at step g), a disconnection (DISC) message showing that reception of fixed band communication is refused, that is, the allocable bandwidth BW0, is sent to #5 of the ATM switching network 2 (step i).

When the originating terminal equipment 4-1 performs variable band communication and the terminating terminal equipment 4-2 performs fixed band communication (YES at step j), the allocable bandwidth BW0 or BW1 and the requested communication bandwidth BW2 are compared (step k). Then, when the allocable bandwidth BW0 or BW1 is smaller than the requested communication bandwidth BW2 of the terminating terminal equipment 4-2 (YES at step k), fixed band communication of the requested communication bandwidth BW2 cannot be received, so a disconnection (DISC) message is sent to #3 of the ATM switching network 2 (step 1). On the other hand, when the allocable bandwidth BW0 or BW1 is larger than the requested communication bandwidth BW2 of the terminating terminal equipment 4-2 (NO at step k), the requested communication bandwidth BW2 is decided on as the available bandwidth BW3 (step m) and a connection (CONN) message containing the BW3 is sent to #3 of the ATM switching network 2.

When both the originating terminal equipment 4-1 and the terminating terminal equipment 4-2 perform fixed band communication (NO at step j), it is judged if the allocable bandwidth BW0 and the requested communication bandwidth BW2 coincide (step n). If equal at this time (YES at step n), the requested communication bandwidth BW0 is decided on as the available bandwidth BW3 (step o) and a connection (CONN)

message containing this BW3 is sent to #5 of the ATM switching network 2. On the other hand, if not equal (NO at step n), a disconnection (DISC) message is sent (step p).

In this way, the terminating terminal equipment 4-2 decides on the available bandwidth BW3.

In FIG. 14B, when the originating terminal equipment 4-1 performs variable band communication, if the ATM switching network 2 receives a connection (CONN) message containing the available bandwidth BW3 or a disconnection message (DISC) message from the terminating terminal equipment 4-2, it sends the above message as is to #6 of the originating terminal equipment 4-1 (step j). On the other hand, when the originating terminal equipment 4-1 performs fixed band communication, if the ATM switching network 2 receives from the terminating terminal equipment 4-2 a connection (CONN) message containing the available bandwidth BW3 or a disconnection (DISC) message (step k), it sends the above message as is to #4 of the originating terminal equipment 4-1 (step 1).

In FIG. 13B, if the terminal equipment 4-1 receives a connection (CONN) message or disconnection (DISC) message from the ATM switching network 2 in a variable band communication state (step f), it judges which message has been received (step g).

When receiving a disconnection (DISC) message (YES at step g), it gives up on communication (step h).

When receiving a connection (CONN) message (NO at step g) and when the opposing terminal equipment performs variable band communication (YES at step i), it performs variable band communication by the available bandwidth BW3 (step j). On the other hand, when receiving a connection (CONN) message (NO at step g) and when the opposing terminal equipment is performing fixed band communication (NO at step i), it performs fixed band communication by the available bandwidth BW3 (step k).

If the terminal equipment 4-1 receives connection (CONN) message or disconnection (DISC) message from the ATM switching network 2 in the fixed band communication state (step 1), it judges which message has been received (step m).

When receiving a disconnection (DISC) message (YES at step m), it gives up on communication (step n).

When receiving a connection (CONN) message (NO at step m), it performs fixed band communication by the available bandwidth BW3.

The call setup is performed by the above flow of processing.

Figures 2, 16A:
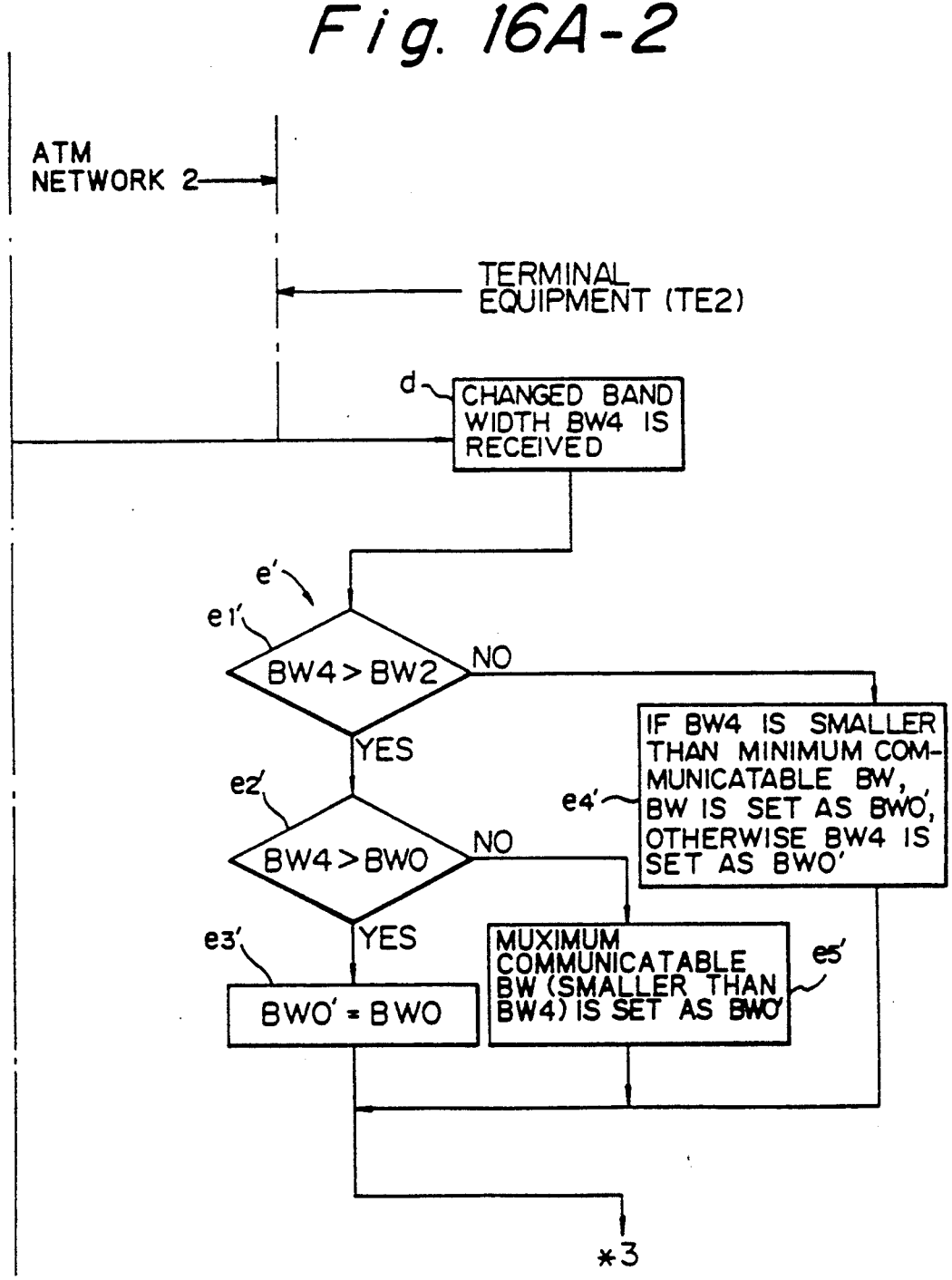
FIG. 16A (16A-1, 16A-2)

FIG. 16A, FIG. 16B, and FIG. 16C are processing flow charts for changing the state of bandwidth during communication. When, during communication, the bandwidth state BW3 of the ATM switching network 2 changes to the bandwidth state BW4 (step a), the changed bandwidth BW4 is notified to the terminal equipment 4-1 and 4-2 (step b). The terminal equipment 4-1 and 4-2, when receiving notification of the changed bandwidth (step c and d), send to the ATM switching network 2 the changed communication bandwidths BW0' and BW1' which they currently request (steps f and h).

The ATM switching network 2, when receiving the changed communication bandwidth BW0, of the terminal equipment 4-1 and the changed communication bandwidth BW1' of the terminal equipment 4-2 (step h), compares the sizes of the changed communication bandwidths BW0, and BW1' received from the terminal equipment 4-1 and 4-2 (step i).

If the changed communication bandwidth BW0' from the terminal equipment 4-1 is smaller than the changed communication bandwidth BW1' from the terminal equipment 4-2 and is smaller than the changed communication bandwidth BW4 (YES at step j), the changed bandwidth BW0' from the terminal equipment 4-1 is decided on as the changed available bandwidth BW5 (step k) and an information (INFO) message containing this BW5 is sent to the two terminal equipment 4-1 and 4-2 (step 1).

On the other hand, if the changed communication bandwidth BW0' from the terminal equipment 4-1 is smaller than the changed communication bandwidth BW1' from the terminal equipment 4-2 and is larger than the changed communication bandwidth BW4 (NO at step j), the changed bandwidth BW4 of the ATM switching network 2 is decided on as the changed available bandwidth BW5 (step m) and an information (INFO) message containing this BW5 is sent to the two terminal equipment 4-1 and 4-2 (step 1).

If the changed communication bandwidth BW1' from the terminal equipment 4-2 is smaller than the changed communication bandwidth BW0' from the terminal equipment 4-1 and is smaller than the changed communication bandwidth BW4 (YES at step n), the changed bandwidth BW1' from the terminal equipment 4-2 is decided on as the changed available bandwidth BW5 (step o) and an information (INFO) message containing this BW5 is sent to the two terminal equipment 4-1 and 4-2 (step 1).

If the changed communication bandwidth BW1' from the terminal equipment 4-2 is smaller than the changed communication bandwidth BW0 from the terminal equipment 4-1 and is larger than the changed communication bandwidth BW4 (NO at step n), the changed bandwidth BW4 of the ATM switching network 2 is decided on as the changed available bandwidth BW5 (step p) and an information (INFO) message containing this BW5 is sent to the two terminal equipment 4-1 and 4-2 (step 1).

The terminal equipment 4-1 and 4-2, by receiving the changed available bandwidth BW5 (steps q and r), enter a state of communication by the BW5 (steps s and t).

Step e and step e' in FIG. 16 are comprised of the five illustrated sub-steps, with step e and step e' being the same. Looking at step e, this corresponds to the function of the judgement means 41 of FIG. 7. Step e3 decides on BW0 as BW0'. At step e4, when BW4 is smaller than the minimum bandwidth which can be used for communication by the terminal equipment 4-1, that minimum bandwidth of communication is decided on as BW0'. At times other than this, BW4 is decided on as BW0'. At step e5, a bandwidth smaller than BW4 and the maximum bandwidth of communication for the terminal equipment 4-1 is decided on as the BW0'

Figure 17:
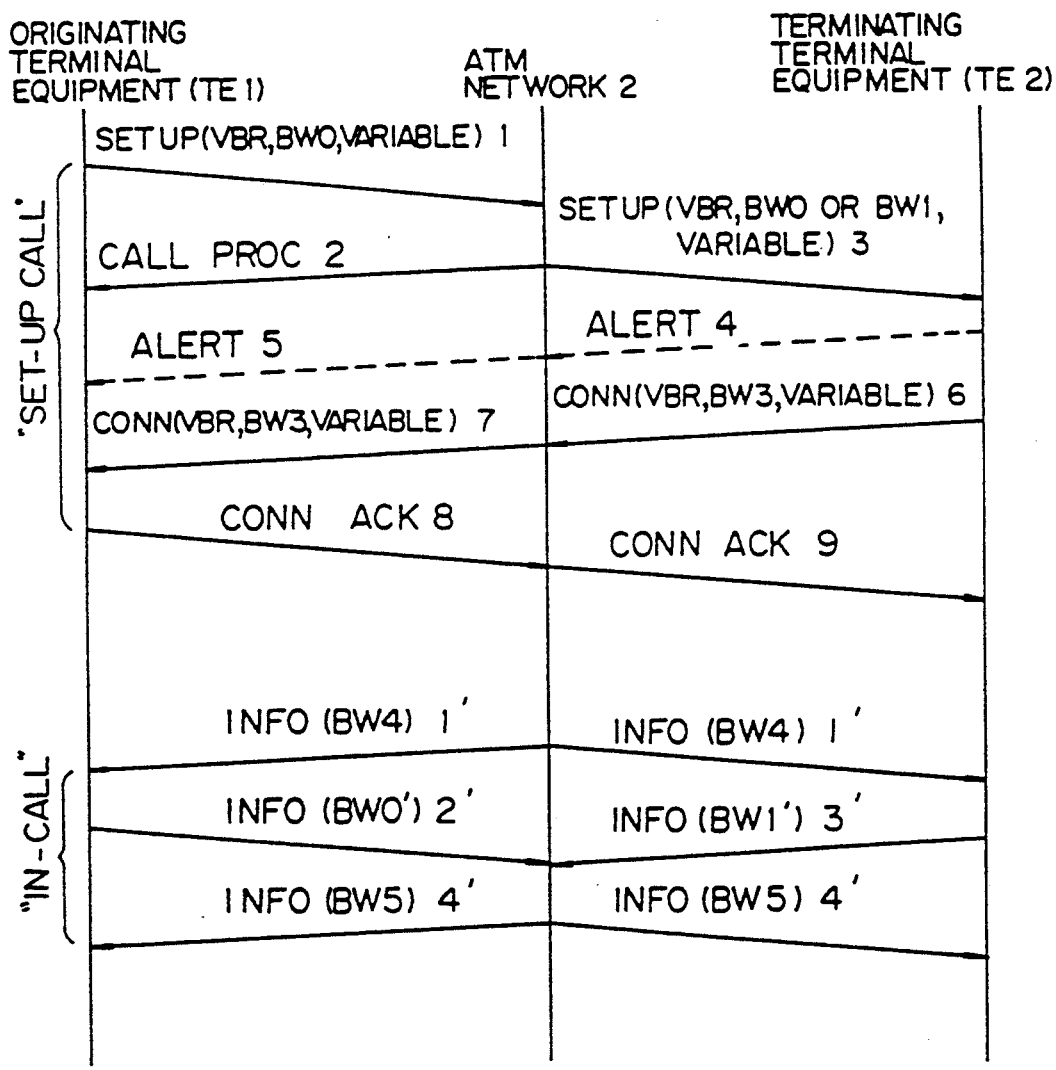
FIG. 17 is a view of an example of a processing sequence executed in the system of the present invention.

FIG. 17 is a view of an example of a processing sequence executed in the system of the present invention. It shows the control sequence during call setup and communication. It assumes the case where the terminal equipment 4-1 sends the information of the bandwidth BW0 to the terminal equipment 4-2.

First, the terminal equipment 4-1 sends a call setup (SETUP) message to the ATM switching network 2 ([1]). This call setup message contains information on the type of communication, showing whether the communication is CBR communication or VBR communication, the maximum bandwidth requested, i.e. the communication bandwidth BW0' and whether the bandwidth used can be changed.

Receiving the call setup (SETUP) message, the ATM switching network 2 returns a call processing (CALL PROC) message to the terminal equipment 4-1 ([2]). Then, the ATM switching network 2 decides, by performing the processing from step a to step h of FIG. 14A on the allocable bandwidth BW1 showing the bandwidth which can be currently provided as recognized by the management apparatus 3 and the communication bandwidth BW0 requested from the terminal equipment 4-1, the allocable bandwidth BW0 or BW1. Then, it inserts this allocable bandwidth BW0 or BW1 in the call setup (SETUP) message to the terminal equipment 4-2 and sends it to the terminal equipment 4-2.

The terminal equipment 4-2, when receiving the call setup (SETUP) message, returns an alert message to the terminal equipment 4-1 ([4] and [5]). The terminal equipment 4-2 decides on whether to perform the communication by VBR communication or by CBR communication by the processing from step a to step p of FIGS. 15A and 15B and decides on the available bandwidth BW3. Then, it returns to the terminal equipment 4-1 a message (one of CONN, REL, REL COM (release completion), or DISC) ([6]). When it sends the connection (CONN) message), it inserts information showing the type of communication, i.e., showing if the communication at the terminating side is CBR communication or VBR communication, the available bandwidth BW3 decided on, and whether the bandwidth used can be changed.

The ATM switching network 2 receives the connection (CONN) message and recognizes the type of communication and the available bandwidth BW3. Then, it notifies the connection (CONN) message as is to the terminal equipment 4-1 ([7]).

The terminal equipment 4-1 receives this received connection (CONN) message, recognizes the type of communication and the available bandwidth BW3, and enters a communication state based on these conditions. Then, it sends back a connection acknowledge (CONN ACK) message showing the connection state to the terminal equipment 4-2 ([8] and [9]).

The terminal equipment 4-2, by receiving this connection acknowledge (CONN ACK) message from the terminal equipment 4-1, enters the communication state under the conditions inserted in the connection (CONN) message.

Next, an explanation will be given of the flow of processing for change of the bandwidth in the case where the line connection is designated as VBR communication and variable. The state of traffic of the ATM switching network 2 is always changing and assumption is made of the case of change of the allocable bandwidth of the ATM switching network 2 from BW3 to BW4.

The ATM switching network 2 inserts the changed bandwidth BW4 in the information (INFO) message at the step b of FIG. 16A and notifies the same to the terminal equipment 4-1 and 4-2 ([1]').

Receiving this, the terminal equipment 4-1 and 4-2 respectively insert the changed communication bandwidth BW0' and BW1' to the ATM switching network 2 in the information (INFO) message and send the same to the ATM switching network 2 ([2]' and [3]').

The ATM switching network 2 performs the processing of step h to step l of FIG. 16B and FIG. 16C and uses the changed communication bandwidths BW0' and BW1' received to decide on the changed available bandwidth BW5. Then, it inserts the changed available bandwidth BW5 in the information (INFO) message and sends it to the terminal equipment 4-1 and 4-2 ([4]).

The BW5 which is decided on is set by the ATM switching network 2 in the management apparatus 3 and by the terminal equipment 4-1 and 4-2 in the memories 420.

In this way, it is possible to change the allocable bandwidth in accordance with changes in the state of traffic of the ATM switching network 2 even during communication.

Further, when it is desired to know the requested communication bandwidth of the originating terminal equipment 4-1 at the terminating terminal equipment 4-2 in call setup, the ATM switching network 2 may notify the terminating terminal equipment 4-2 of both the requested communication bandwidth of the originating terminal equipment 4-1 and the allocable bandwidth of the ATM switching network 2.

Next, an explanation will be given of an example of the architecture of the ATM communication system shown in FIG. 7 and another specific example of the means mentioned above.

Figure 18:
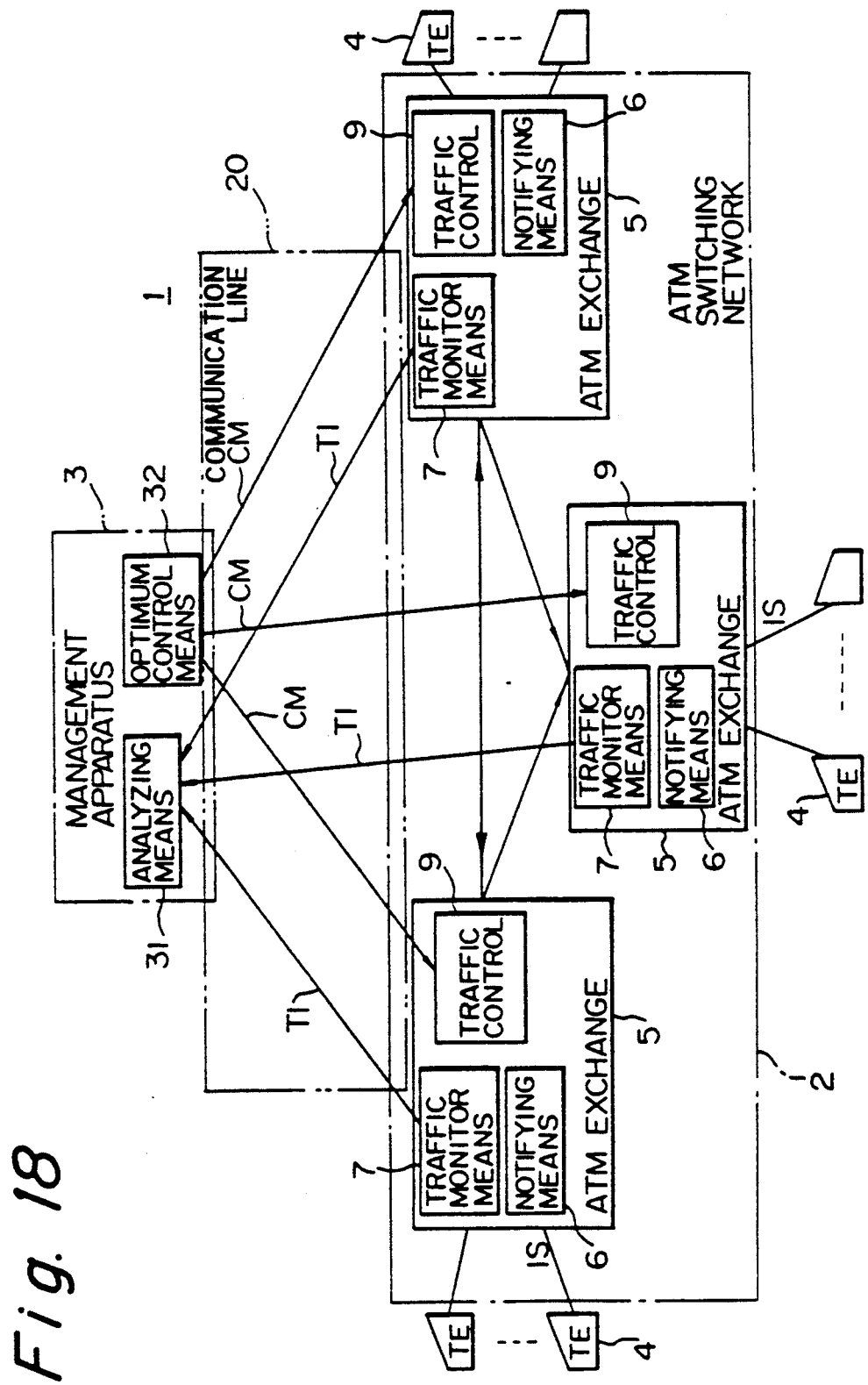
FIG. 18 is a view showing an example of the system architecture of the present invention.

FIG. 18 is a view showing an example of the system architecture of the present invention. This is substantially equivalent to the constitution of FIG. 9 discussed earlier. Therefore, the same reference numerals are given to elements equivalent to the elements of FIG. 9.

The ATM communication system 1 shown in FIG. 18 is basically constructed of three independent layers. That is, it is constructed of:

(i) An ATM switching network 2 which accommodates a plurality of subscriber terminal equipment 4 and has a plurality of ATM exchanges 5 which can be linked with each other, (ii) A management apparatus 3 which monitors and controls the traffic of cells exchanged in the ATM switching network 2 and transferred among the terminal equipment 4, and (iii) A communication line layer 20 which transfers traffic control information between the management apparatus 3 and ATM switching network 2.

Further, specifically, a traffic monitoring means 7 which collects the traffic information TI of the cells is provided in the ATM exchanges 5 of the ATM switching network 2. Further, the analyzing means 31 which analyzes the state of traffic of the cells at the ATM switching network 2 based on traffic information TI obtained through the communication line layer 20 is provided in the management apparatus 3. The optimal control means 32 for giving the optimal traffic control command CM to the ATM exchanges 5 in the ATM switching network 2 through the communication line layer 20 based on the results of analysis of the analyzing means 21 is provided in the management apparatus 3. The traffic control means 9 which executes the traffic control of cells in accordance with the optimal traffic control command CM given from the optimal control means 32 is provided in the ATM exchanges 5. The means 9 is provided with a notifying means 6 which sends an indication signal IS for controlling the amount of transmission of cells in the corresponding terminal equipment 4.

In this way, the ATM communication system is first roughly divided into the ATM switching network 2 and the management apparatus 3 to facilitate the cell traffic control.

The management apparatus 3 places the ATM exchanges 5 all under its control, sums up and monitors the traffic of all the cells in the ATM switching network 2, and gives a suitable traffic control command to all the ATM exchanges 5 based on the results of this monitoring.

Therefore, it is possible to handle the unique cell traffic inherent of ATM.

Figure 19:
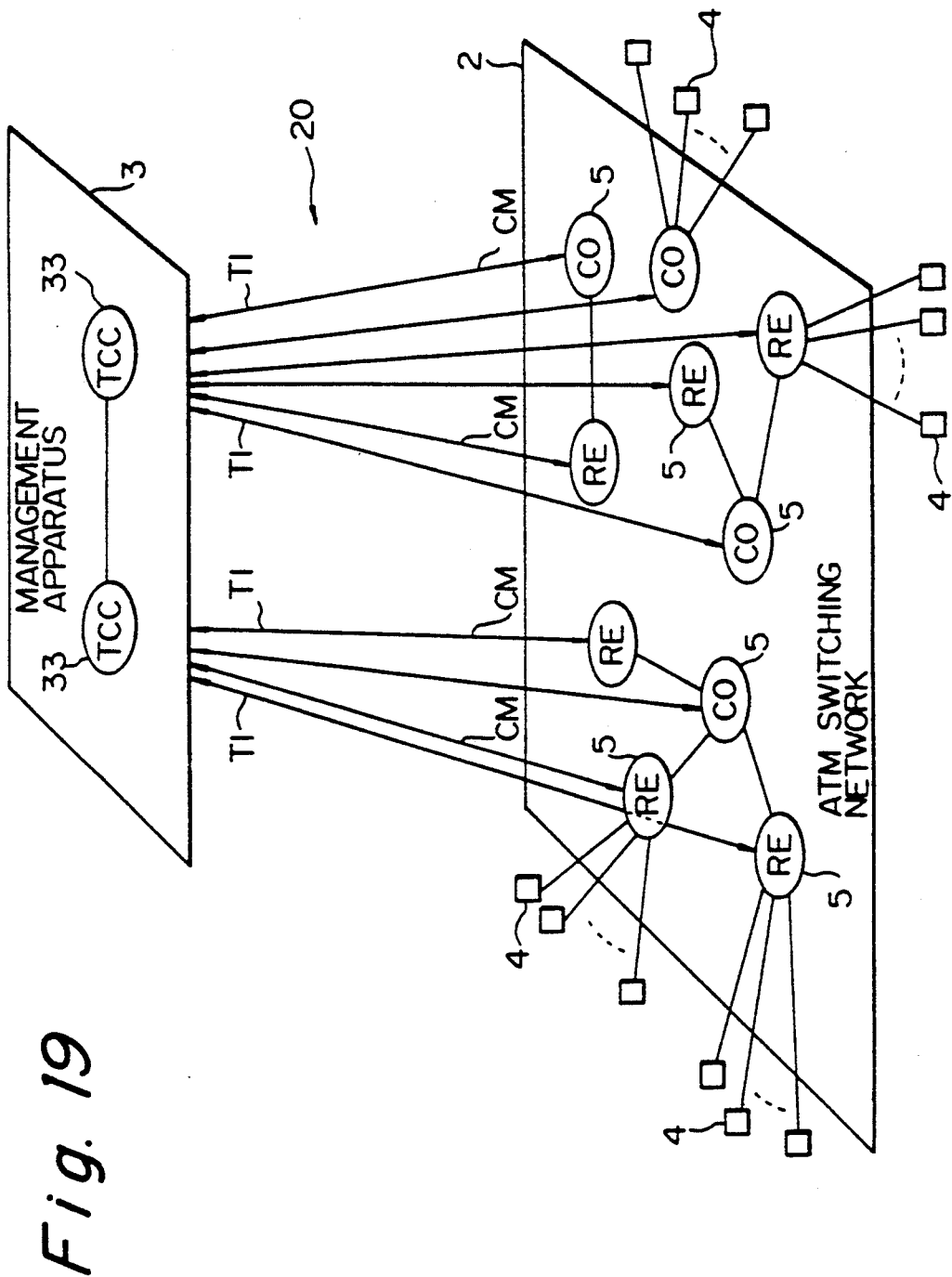
FIG. 19 is a view showing the specific concept based on the system architecture of FIG. 18.

FIG. 19 is a view showing the specific concept based on the system architecture of FIG. 18.

In FIG. 19, it will be understood that the management apparatus 3 is positioned higher than the ATM switching network 2. At the lower ATM switching network 2, the ATM exchanges 5 are in actuality constituted by a central office (CO) and remote electronics (RE).

The ATM exchanges 5 (CO, RE) are provided with the traffic monitoring means 7 shown in FIG. 18. The traffic information collected by these means 7 is fetched by the higher level management apparatus 3 through the communication line layer 20. Note that the communication line layer 20 may be either wired or wireless.

The management apparatus 3 is in actuality comprised of at least one traffic control center (TCC) 33, which center 33 includes at least the above-mentioned analyzing means 31 for analyzing the traffic information TI fetched from the ATM exchanges 5 and an optimal control means 32. When there are two or more traffic control centers (TCC) 33, contact is maintained among the centers 33 regarding the traffic information TI as well.

If the specific concept of the conventional telephone network (line switching or packaging switching network) is drawn as in FIG. 19, it would not be a three-dimensional structure as in that figure, but just a two-dimensional structure. That is, there would be no management apparatus 3 or communication line layer 20, and the functional portions corresponding to the units 3 and 20 would be completely buried in the individual central offices (corresponding to CO in FIG. 19) forming the centers of the telephone network.

Figure 20:
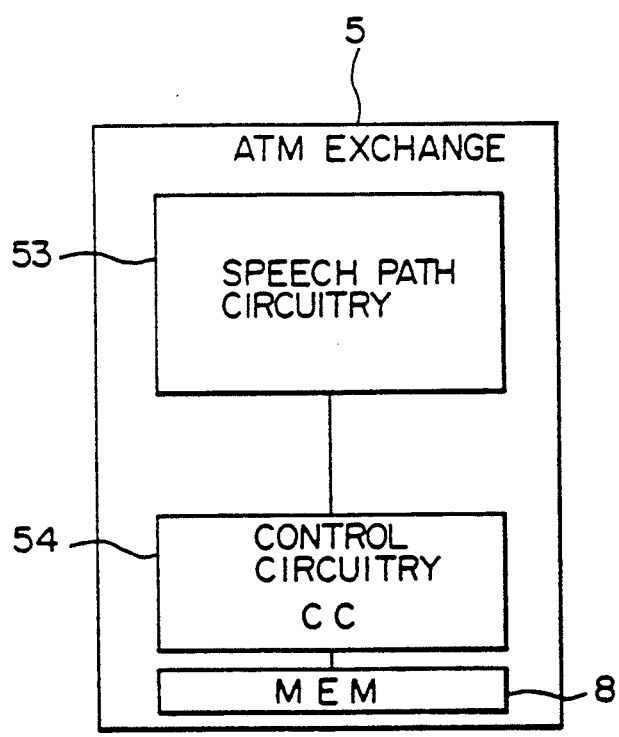
FIG. 20 is a view of the concept of the ATM exchange.

FIG. 20 is a view of the concept of the ATM exchange. There is basically no great difference from a general electronic exchange. That is, the exchange is comprised of speech path circuitry 53 which performs the exchange of cells and sets the paths, control circuitry 54 which controls the setting of the paths, and a memory means 8.

Figure 21A:
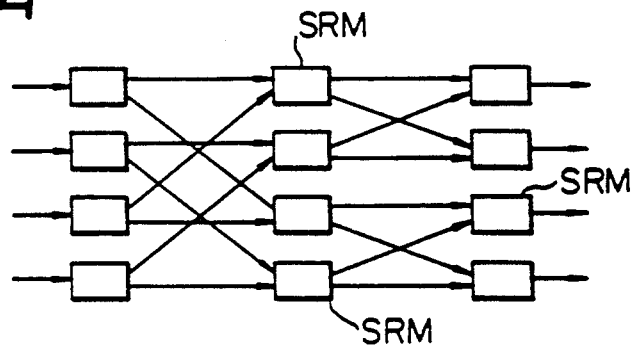
FIG. 21A, FIG. 21B, and FIG. 21C are views showing examples of realization of the speech path circuits in the ATM exchange.
Figure 21B:
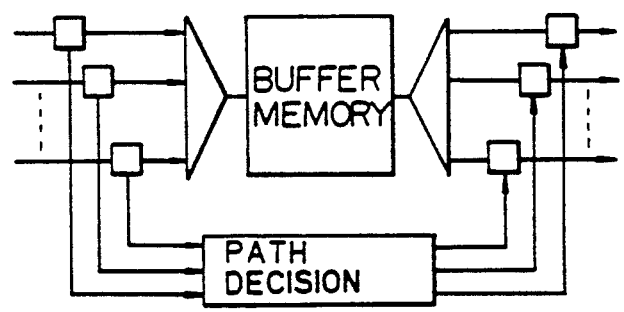
Figure 21C:
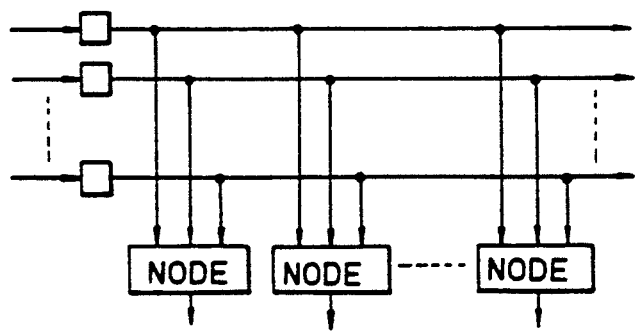

FIG. 21A, FIG. 21B, and FIG. 21C are views showing examples of realization of the speech path circuit in an ATM exchange. They show a first example (FIG. 21A), a second example (FIG. 21B), and a third example (FIG. 21C). Other examples are possible, but since this has no direct bearing on the gist of the present invention, just the above three examples are provided.

The first example is one called a self-rotating type, where the cells are transferred toward paths of the opposing terminal equipment side while selecting the self-rotating modules SRM.

The second example is one called a memory-switch type, where the cells are stored once in a buffer memory, then sent to paths designated by a path decision unit.

The third example is one called a broadcasting bus type, where a large number of nodes are connected to a plurality of paths, the cells are fetched at predetermined nodes, and the cells are sent out on the paths from the nodes.

Figure 22:
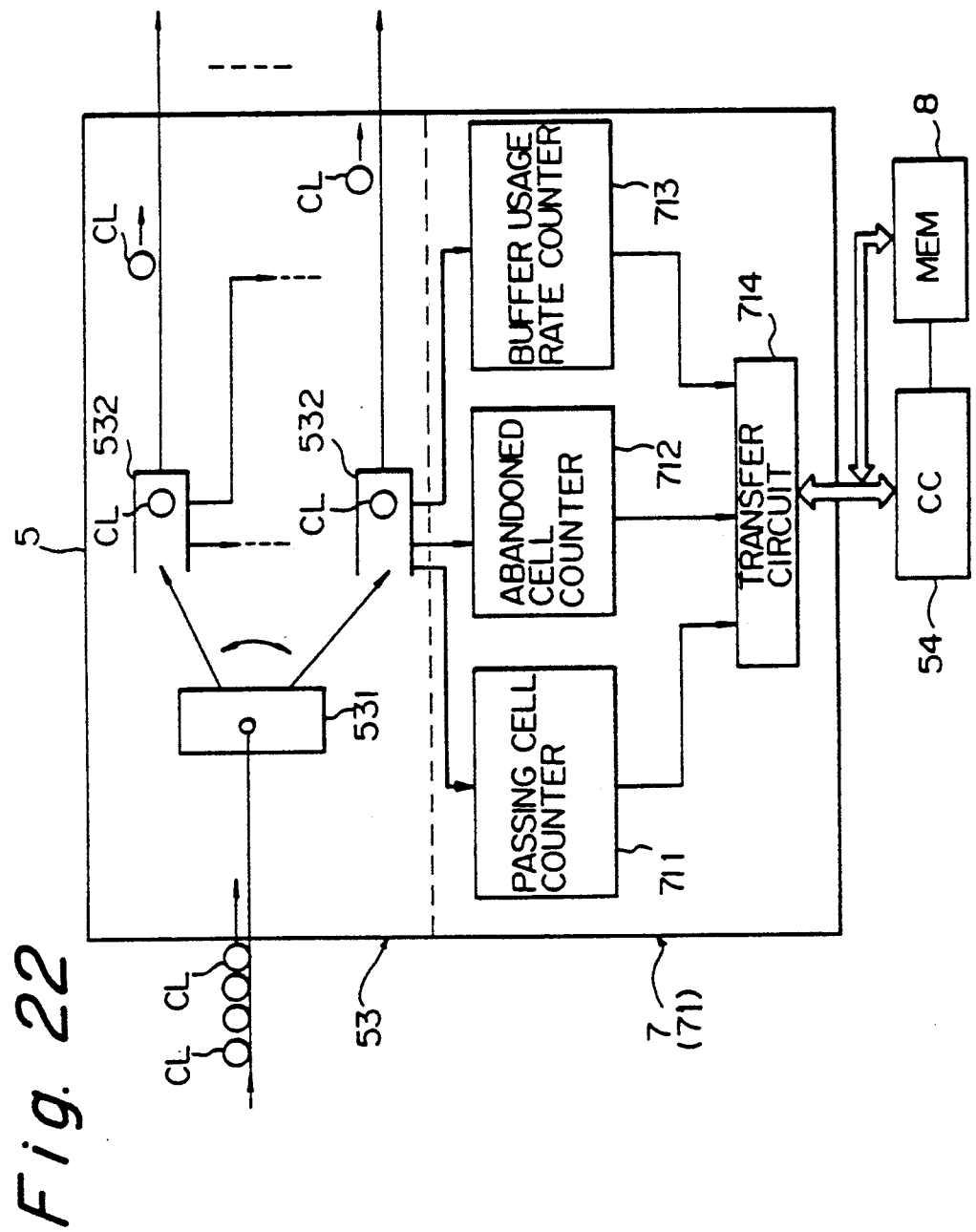
FIG. 22 is a view showing an example of a traffic monitor means.

FIG. 22 is a view showing an example of a traffic monitor means. For ease of understanding, the portion surrounding the traffic monitoring means 7 is also drawn. The figure as a whole shows an ATM exchange 5.

The ATM exchange 5 is comprised of the speech path circuitry 53 and control circuitry 54 shown in FIG. 20, but the traffic monitoring means 7 is inserted here. The control circuitry 54 is comprised of a central control unit (CC) 54 and a memory 8. The speech path circuitry 53, if illustrated in concept, distributes cells CL (shown by o mark in figure) received from the left of the figure from a distribution unit 531 under the control of the central control unit and stores them once in a queue buffer 532 for a predetermined path. The cells CL stored here are sent out to the right side of the figure in order after that.

The traffic monitoring means 7 cooperating with the speech path circuitry 53 is, for example, provided with a passing cell counter 711, an abandoned cell counter 712, and a buffer usage rate counter 713, the count data from the counters being collected in the central control unit CC through the transfer circuit 714.

How many cells CL have been fetched in the speech path circuitry 53 (passing cell counter 711), how many cells CL have been erased by the following cells CL in the queue buffers 532 due to the increase of the cell traffic (abandoned cell counter 712), and what percent of the maximum capacity of the queue buffers on an average the amount of the cells CL stored at all times in the queue buffers 532 constitute (buffer usage rate counter 713) become the basic data showing the state of traffic of the cells, which becomes in turn the above-mentioned traffic information TI. Note that the above-mentioned CC does not in principle perform direct traffic control by itself by the information TI, but immediately sends the information to the management apparatus 3. The above-mentioned communication line layer 20 exists for transmission of this.

Figure 23:
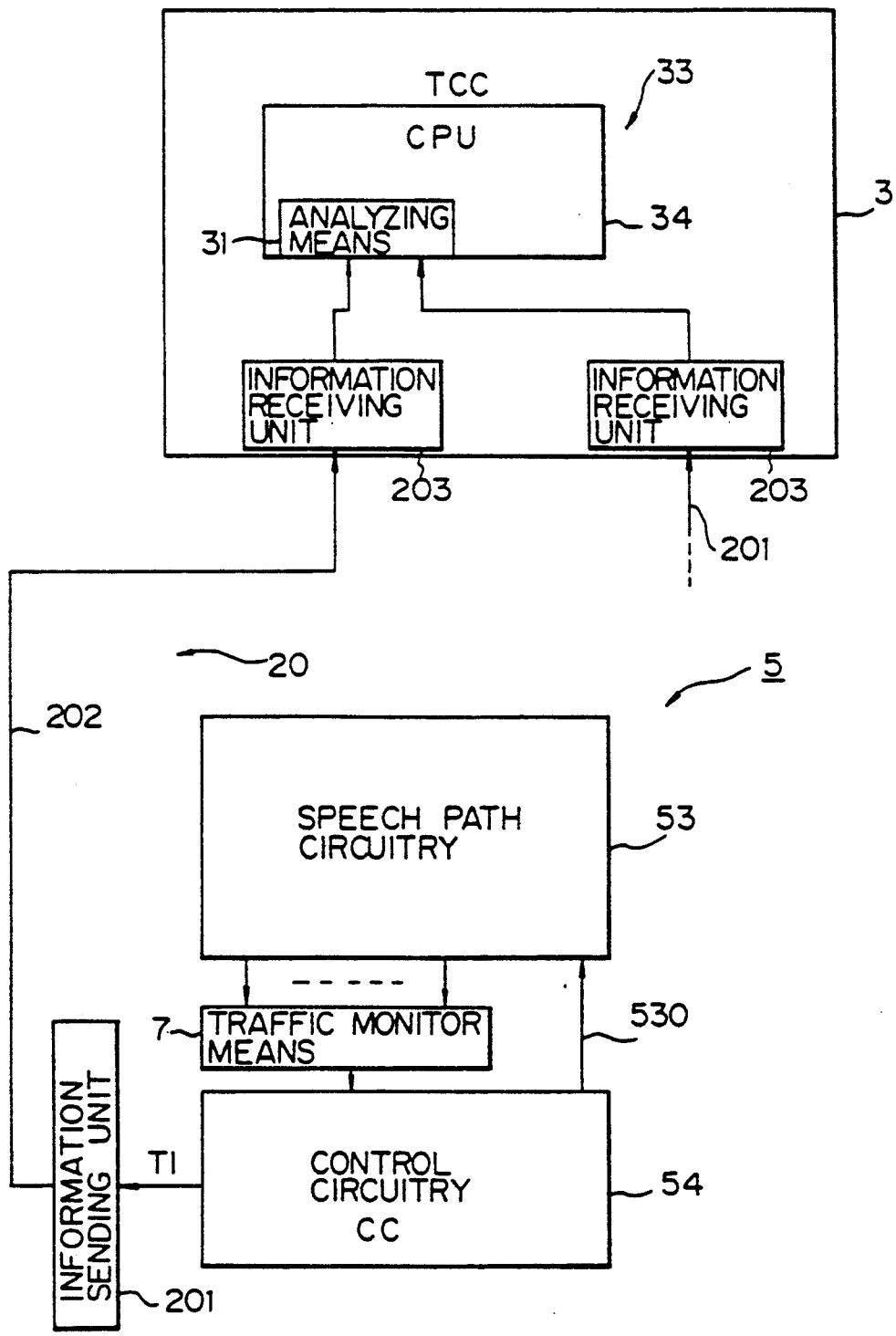
FIG. 23 is a view showing somewhat more specifically the upstream side of the communication line layer.

FIG. 23 is a view showing somewhat more specifically the upstream side of the communication line layer. The portion surrounding the communication line layer 20 is also drawn, so the figure as a whole shows in part the ATM communication system.

The traffic information TI obtained from the speech path circuitry 53 shown in FIG. 22 by the traffic monitoring means 7 illustrated is collected by the central control unit CC and then enters the communication line layer 20. First, it enters the information sending unit 201, then passes through an upstream line 202, and reaches an information receiving unit 203 at the end of the communication line layer 20. The received traffic information TI is input to the central processing unit (CPU) 34 forming the heart of the traffic control center (TCC) 33 shown in FIG. 19. The input information TI is supplied in the analyzing means 31 in the CPU 34. Note that the analyzing means 31 is supplied similarly with the traffic information TI from the other ATM exchanges 5 in the ATM switching network 2 through the corresponding upstream lines 201 and information receiving units 203.

Note that reference numeral 403 in the figure is a path setting path control line for connecting the speech path circuitry 53 and the central control unit (CC) 54.

Figure 24:
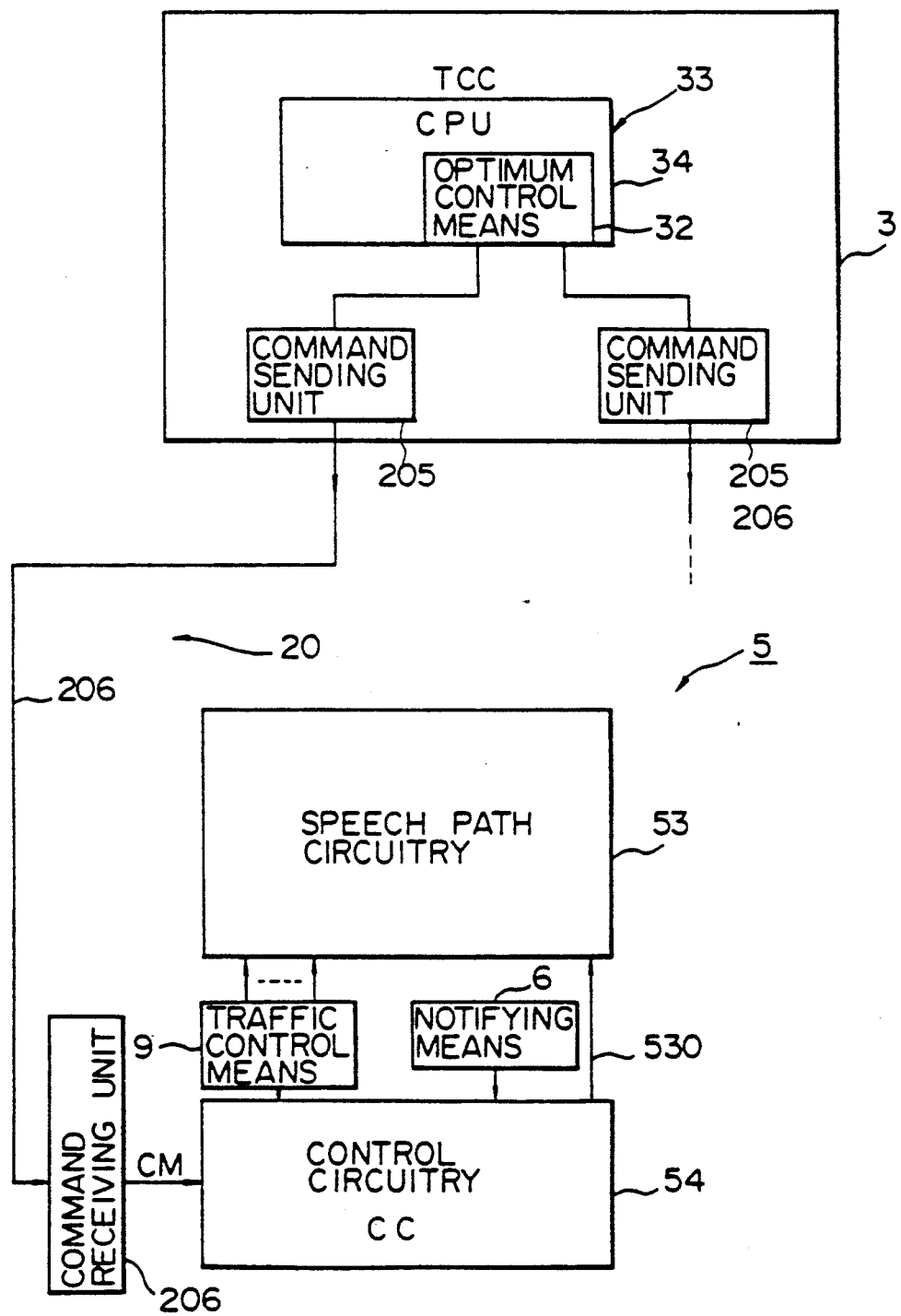
FIG. 24 is a view showing somewhat more specifically the downstream side of the communication line layer.

FIG. 24 is a view showing somewhat more specifically the downstream side of the communication line layer. The optimal traffic control information based on the results of analysis by the analyzing means 31 of FIG. 23 is produced by the optimal control unit 32 in the CPU 34. This is used as the command CM and indicates the system for sending information to the ATM switching network 2 side. First, it enters a command sending unit 205, then passes through a downstream line 206, and reaches a command receiving unit 207 at the end of the communication line layer 20. The command receiving unit 207 is in the ATM switching network 2 and gives the optimal traffic control command CM to the central control unit (CC) 54 in the ATM exchange 5. The command CM is supplied to the traffic control means 9, based on which command CM the traffic control is performed for the speech path circuitry 53. The means 9 drives the notifying means 6 and sends an instruction signal IS to the corresponding terminal equipment 4.

Figure 25:
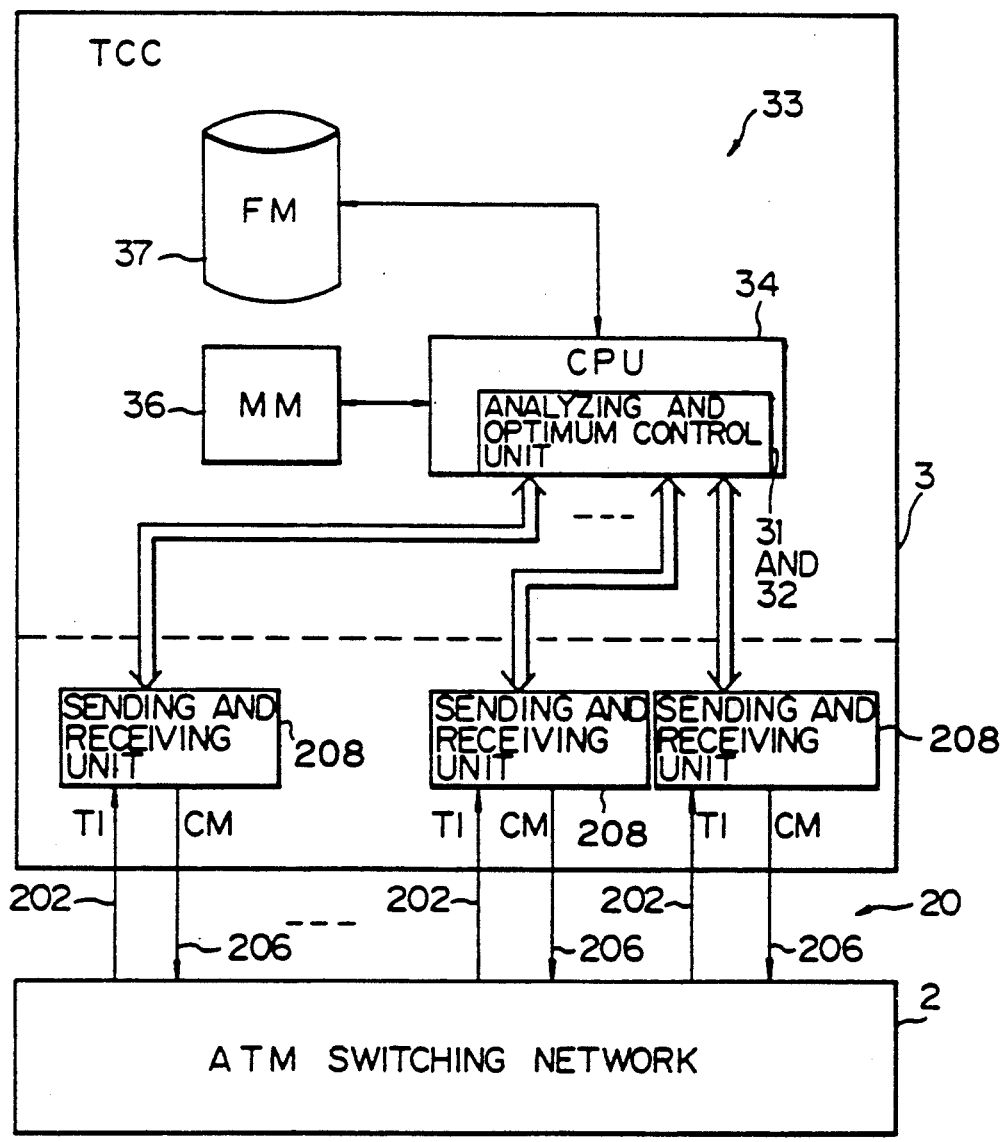
FIG. 25 is a view showing somewhat more specifically the traffic control center.

FIG. 25 is a view showing somewhat more specifically the traffic control center. The surrounding portion is also drawn. Note that the apparatus 203 of FIG. 6 and the apparatus 205 of FIG. 24, the surrounding portions, are actually comprised of a single unit, so FIG. 25 shows the apparatuses 203 and 205 as a single sending and receiving unit. Further, the analyzing means 31 and the optimal control means 32 are shown as a single unit in the CPU 34.

The central processing unit (CPU) 34 cooperates with a main memory (MM) 36 and a file memory (FM) 37. The main memory (MM) 36 stores analysis programs for operating the analyzing means 31 and command programs for operating the optimal control means 32 and also traffic information (TI) data and analyzed processed data. Other general programs for controlling various other operations are of course also stored together in the main memory (MM) 36.

On the other hand, the file memory (FM) 37 holds the reference data required for issuing a command from the optimal control means 32 for the results of analysis from the analyzing means 31.

Figure 26A:
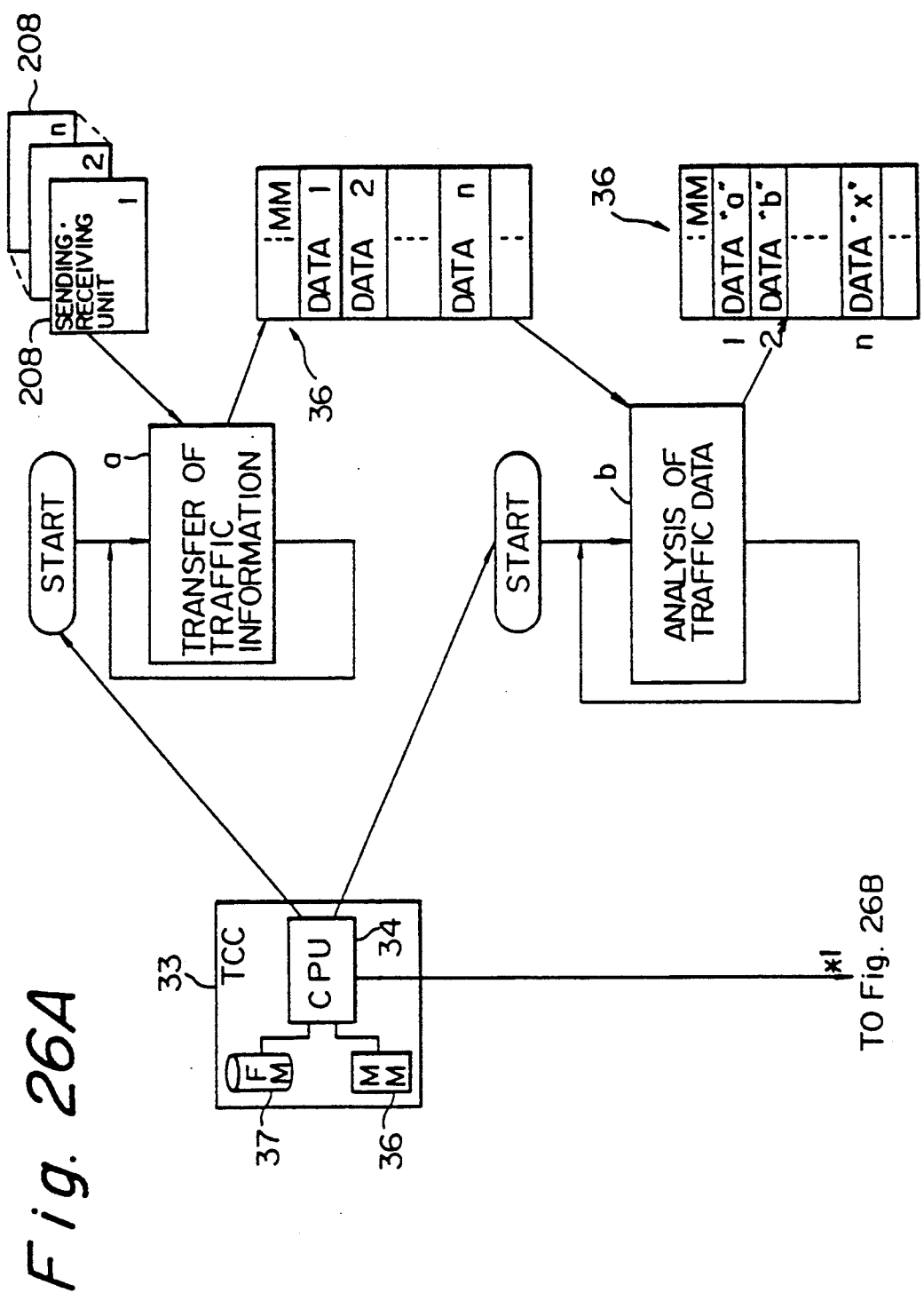
FIG. 26A is a view showing schematically the operation of an analyzing means in a central processing unit.
Figure 26B:
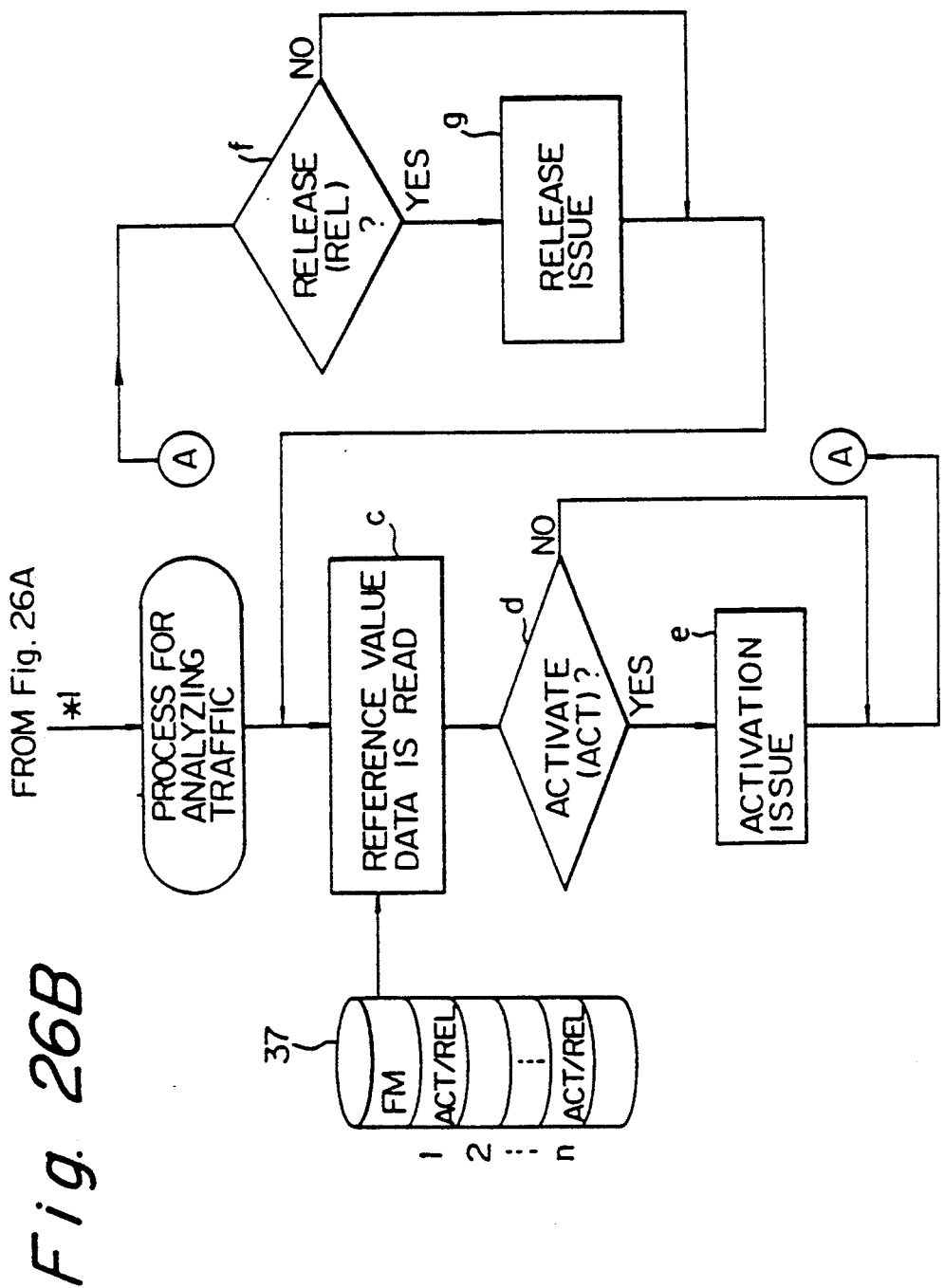
FIG. 26B is a view showing schematically the operation of an optimum control means in the central processing unit.

FIG. 26A is a view showing schematically the operation of an analyzing means in a central processing unit, and FIG. 26B is a view showing schematically the operation of an optimum control means in the central processing unit. The processing of FIG. 26B is executed after the analysis processing shown in FIG. 26A by the central processing unit (CPU) 34 shown in FIG. 26A.

In FIG. 26A, traffic information transfer processing (step a) for fetching traffic information TI from the sending and receiving units 208 corresponding to the ATM exchanges shown in FIG. 25 is continuously repeated.

The traffic information (so-called raw data) fetched at step a is stored once at a predetermined address in the main memory (MM) 36 as data [1], data [2] ... data [n].

The data fetched at step a and accumulated in the main memory (MM) 36 is subjected to processing at step b. Step b is processing for analyzing the above accumulated data and applies various types of processing to the data. The processed data is stored in other areas of the same main memory (MM) 36 as the data "a", "b", ... "x" corresponding to the data [1], [2] ... [n]. Note that the "processing" of data spoken of here means, for example, the calculation of cumulative number of cells CL passing in a certain time period or the calculation of the usage rate of queue buffers (532 in FIG. 22) in a certain period (calculation by maximum number and minimum number of cells contained in queue buffers).

When the above-mentioned analysis processing of the traffic is finished, steps c, d, e, f, and g in FIG. 26 start. These steps are processing for issuing the above-mentioned optimal traffic control command CM. The command CM, specifically, for example, is made in the form of issuance of orders for "activation" and "release", with the "activation" order commanding the corresponding ATM exchange 5 to suppress the flow of cells and the "release" order commanding it to return the flow which has been suppressed to the normal level of flow. The judgement as to the "activation" and "release" orders is made at step d and step f of FIG. 26B and these are issued at step e and step g, respectively.

Judgement as to the above activation and release orders requires comparison of the preset reference data and the above-mentioned processed data. Giving an example, if a maximum reference value of 70 percent and a minimum reference value of 30 percent is set for a queue buffer 532, then an "activation" order is issued when it is judged that the usage rate of the queue buffer is over 70 percent and a "release" order is issued when the rate has fallen under 30 percent. So-called hysteresis is given to give stability to the control of the flow of cells. The above-mentioned file memory (FM) 37 holds the above reference data, which is read out at step c and used for the judgement of the activation or release order.

Figure 27:
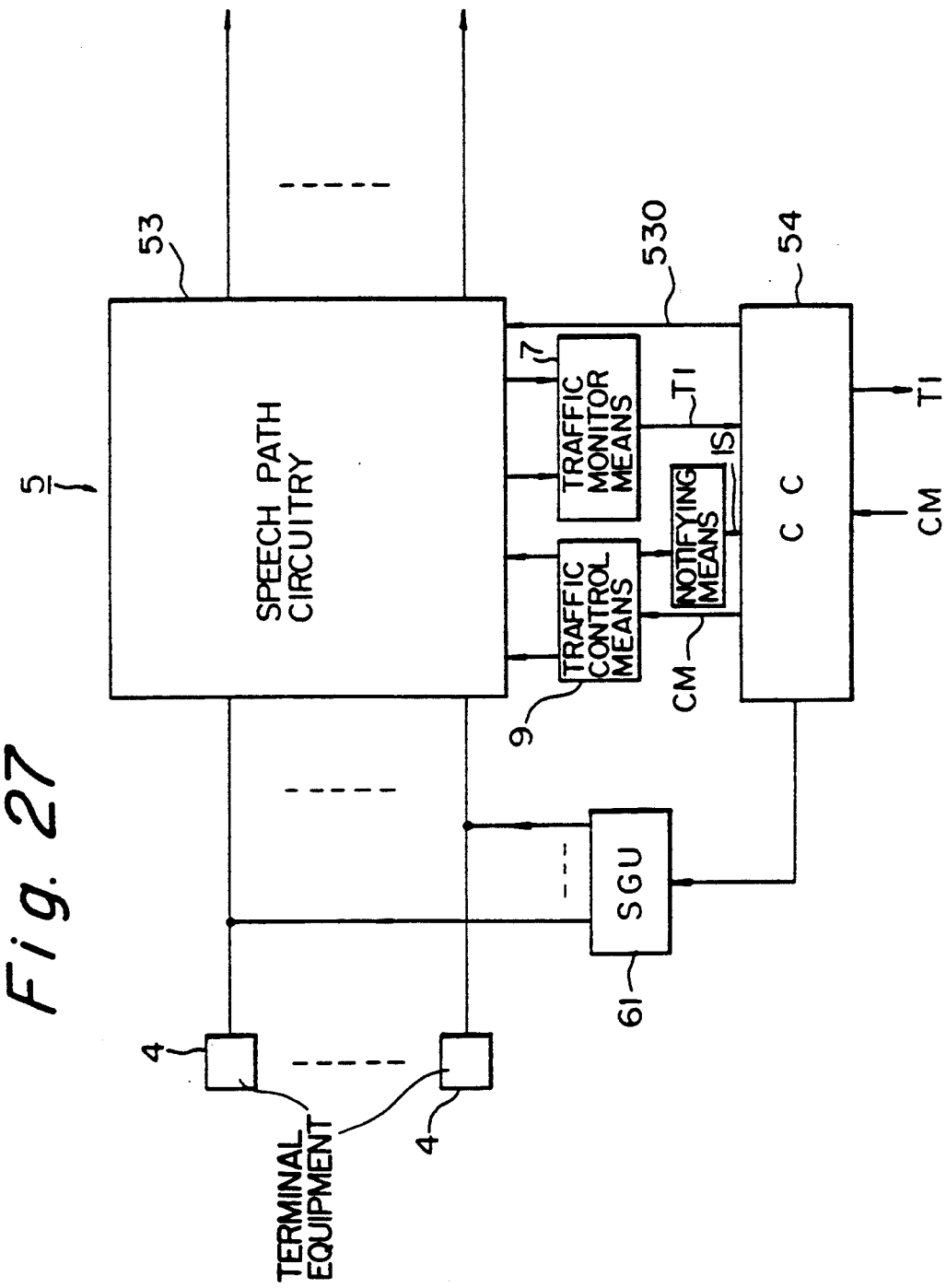
FIG. 27 is a view showing an ATM exchange operating receiving the optimum traffic control command.

FIG. 27 is a view showing an ATM exchange operating receiving the optimum traffic control command. The exchange is substantially the same as the ATM exchange 5 shown in FIG. 23 and FIG. 24, but a signal generating unit (SGU) 61 cooperating with the notifying means 6 is further shown. The signal generating unit 61, which is controlled by the means 6, sends out a signal to the corresponding terminal equipment 4 which is sending out cells so as to command that the interval of sending of the cells be lengthened (during activation) or that it be returned to its original state (release etc.). This is performed through the D-channel of the ISDN.

As the activation actions which the traffic control means 9 performs when receiving an optimal traffic control command CM, in particular an "activation" command, through the central control unit 54, there may be mentioned:

(i) A cell abandonment instruction (clearing all cells in queue buffer 532), (ii) A cell detour instruction (rewriting VCI table (not shown) in speech path circuitry 53), and (iii) A passing cell priority instruction (abandonment from cells carrying low priority flags).

Finally, an explanation will be made of a specific example of the traffic control means.

Figure 28:
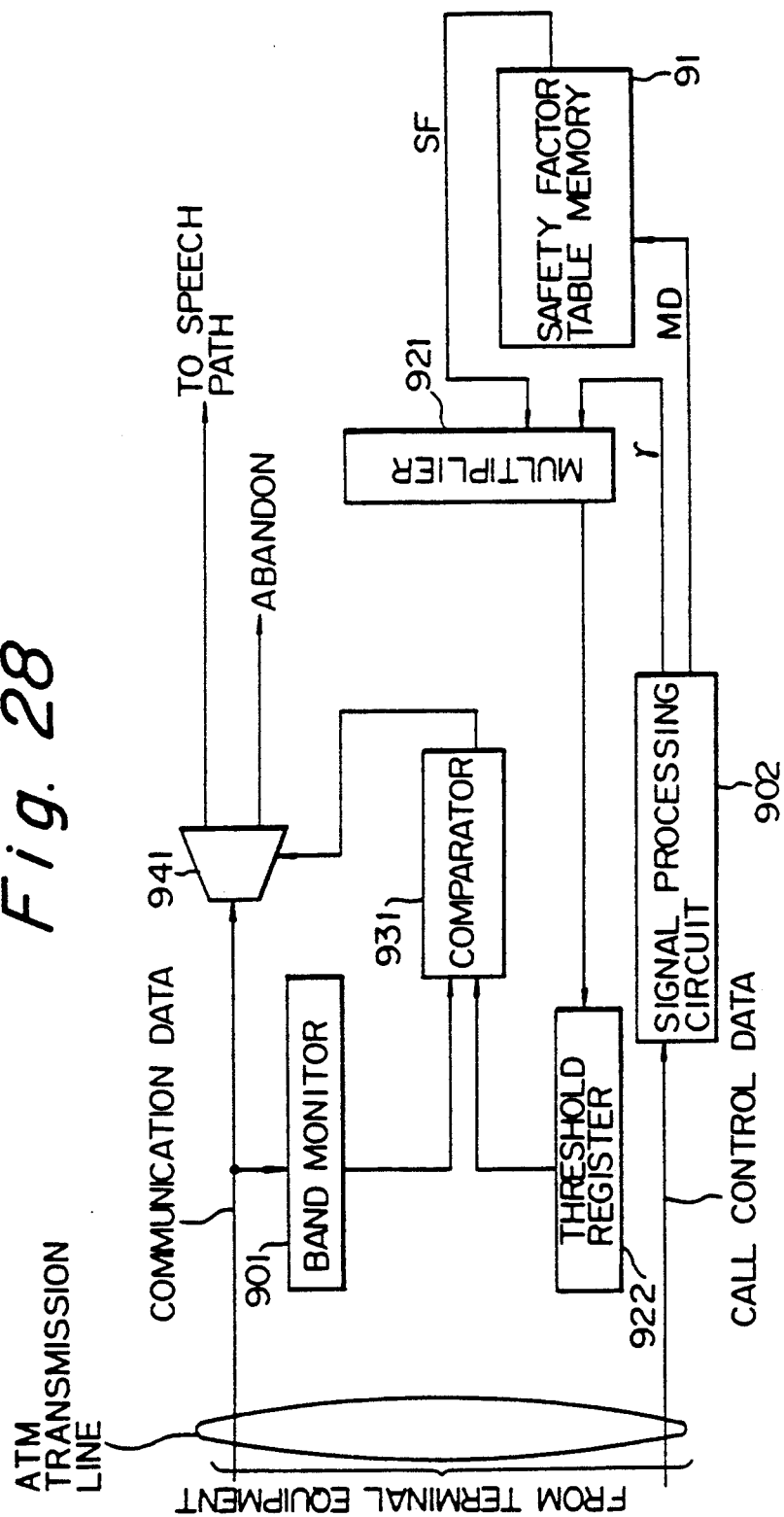
FIG. 28 is a view showing a specific example of the traffic control means.

FIG. 28 is a view showing a specific example of the traffic control means. It shows more specifically the means 9 in FIG. 8B. The threshold generating unit 91 in FIG. 8B is comprised of a multiplier 921 and a threshold register 922. A comparing unit 93 is comprised of a digital comparator 931.

At the time of call setup, call control data send from a terminal equipment is applied to a signal processing circuit 902 provided for processing the same. The circuit 902 fetches from the input data the available bandwidth information γ instructed from the terminal equipment and, at the same time, fetches the media classification information MD of the media for communication. The information MD shows, for example, the attributes of the communication data, for example, "compressed picture", "speech data without silence", "data", etc.

The above information γ and MD are input to a multiplier 921 and a safety factor table memory unit 91. The safety factor SF corresponding to the type of the media is read from the memory unit 91. Examples are provided below:

| MD | SF |
| --- | --- |
| Compressed picture data (coded between two adjacent frames) | 1.4 |
| Compressed picture data (coded inside each frame) | 1.2 |
| Speech data without silent term | 1.0 |
| Data | 2.0 |

In short, the higher the burst nature of the information, the higher the SF is set, e.g., 2.0. The safety factor SF is multiplied by the multiplier 921 with the above-mentioned γ (SF·γ) and stored in the threshold register 922.

On the other hand, a bandwidth monitor 901 continuously monitors the amount of traffic of the communication data. This monitoring value and the stored value in the register 922 are applied to the comparison inputs of the comparator 931. If the result of the comparison is that the former value is larger than the latter value, a selector 941 (corresponding to the cell abandonment instruction unit 94) is switched by the output of the comparison and the amount of overflow of the traffic is abandoned. Therefore, the traffic is policed with a high degree of service.

As explained above, according to the present invention, it is possible to flexibly and efficiently use the available bandwidth in a B-ISDN according to changes in the state of the network.

Therefore, first, during call setup, since the allocable bandwidth which can be allocated from the ATM switching network side is notified to the terminal equipment side, even when a sufficient bandwidth cannot be secured, communication becomes possible at the minimum bandwidth which can be allowed and therefore unnecessary call setup operations with the ATM switching network side can be eliminated.

Second, even if the terminal equipment side is not allocated a sufficient available bandwidth during call setup, there is the possibility of securing a sufficient bandwidth during communication due to subsequent changes in the network state.

Third, looking from the network side, it is possible to reduce the traffic during communication during periods of congestion and therefore possible to quickly return from a congested state to a normal state.

Fourth, looking from the terminal equipment side, it is possible to learn the state of change of the bandwidth, not knowable up to now, so changes of the bandwidth used become easy.

We claim:
1. An ATM communication system comprising:
an ATM switching network which includes:
a plurality of terminal equipment including judgement means for determining whether the allocable bandwidth from said ATM switching network is a bandwidth of a size allocable for communication;
a plurality of ATM exchanges and controls exchanges among said plurality of terminal equipment;
notifying means for notifying said plurality of terminal equipment of the allocable bandwidth which can be used in accordance with the amount of traffic in said ATM switching network; and
a management apparatus which manages the traffic in said ATM switching network;
when the notified allocable bandwidth is a bandwidth which can be used for communication, said plurality of terminal equipment starting the communication in the range of that bandwidth.
2. A system as set forth in claim 1, wherein
said ATM switching network further includes traffic monitoring means which monitors the amount of traffic in said ATM switching network; and wherein
said management apparatus includes analyzing means which analyzes the allocable bandwidth which can be given to said plurality of terminal equipment in accordance with the amount of traffic.
3. A system as set forth in claim 1, wherein said plurality of terminal equipment includes request means for requesting to said ATM switching network the communication bandwidth required for their own communication.
4. A system as set forth in claim 1, wherein said ATM switching network further comprises:
memory means for storing the communication bandwidth requested by said plurality of terminal equipment and required for communication of said plurality of terminal equipment; and
bandwidth changing means which changes the bandwidth to a communication bandwidth stored in said memory means when the allocable bandwidth expands to larger than the communication bandwidth during a call of said plurality of terminal equipment.
5. An ATM communication system comprising:
an ATM switching network which includes:
a plurality of ATM exchanges and controls exchanges among a plurality of terminal equipment, comprising
notifying means;
traffic monitoring mean for monitoring the amount of traffic in said ATM switching network; and
a management apparatus which manages the traffic in said ATM switching network, said management apparatus including:
analyzing means for analyzing an allocable bandwidth in accordance with the amount of traffic from said traffic monitoring means; and
first terminal equipment and second terminal equipment which can communicate with each other and including first request means and second request means which request a first communication bandwidth and a second communication bandwidth to a side of said ATM switching network, said analyzing means analyzing the allocable bandwidth given to said first and second terminal equipment;

said first and second terminal equipment respectively sending out the first and second communication bandwidths to said ATM switching network from said first and second request means;

said analyzing means deciding on a common available bandwidth for said first an second terminal equipment based on said first and second communication bandwidths and the amount of traffic monitored by said traffic monitoring means, the determined available bandwidth notified to said first and second terminal equipment through said notifying means.

6. A system as set forth in claim 5, wherein said first and second communication bandwidths are the maximum bandwidths expected for communication by said first and second terminal equipment.

7. A system as set forth in claim 5, wherein said first and second communication bandwidths are the mean values of the bandwidths expected for communication by said first and second terminal equipment.

8. A system as set forth in claim 5, wherein
said ATM switching network further includes:
memory means which stores said first and second communication bandwidths requested from said first and second communication bandwidths requested from said first and second terminal equipment at the start of communication between said plurality of terminal equipment; and
wherein
said analyzing means includes bandwidth changing means which notifies the first and second terminal equipment of a changed bandwidth comprising the current first and second communication bandwidths expanded to a new allocable bandwidth when determining, during communication between said first and second terminal equipment, that the allocable bandwidth has expanded to said first and second communication bandwidths stored in said memory means.

9. A system as set forth in claim 5, wherein said first and second terminal equipment respectively include:
first memory means; and
second memory means, said first and second memory means storing respectively said first and second communication bandwidths requested to said ATM switching network at the start of communication.

10. A system as set forth in claim 5, wherein said first and second terminal equipment respectively include:
first decision means; and
second decision means, said first and second decision means deciding whether to start communication by the available bandwidth instructed from said ATM switching network.

11. A system as set forth in claim 5, wherein said plurality of ATM exchanges further comprise traffic control means and wherein said management apparatus is provided with optimal control means which produces optimal traffic control information based on the results of analysis by said analyzing means and supplies the optimal traffic information to said ATM switching network, said traffic control means receiving the optimal traffic control information and performing control of the traffic in said ATM exchanges.

12. A system as set forth in claim 11, wherein said plurality of ATM exchanges further comprises bandwidth changing means for notifying said first and second terminal equipment that the present available bandwidth allocated for communication therebetween will be changed based on the optimal traffic control information provided in said ATM exchanges.

13. A system as set forth in claim 12, wherein said traffic control means in said ATM exchanges includes:
a safety factor table unit which sets in advance the safety factor showing the range of allowance of fluctuations in the amount of traffic for each of the communication media which said first and second terminal equipment handle and stores the set safety factors as a table;
a threshold generating unit which generates a threshold value obtained by multiplying the available bandwidths by the corresponding safety factors for each of the communication media;
a comparing unit, operatively connected to said traffic monitoring means, which compares the amount of traffic obtained by said traffic monitoring means and the threshold value obtained from said threshold generating unit; and
a cell abandonment indicating unit, operatively connected to said comparing unit, which sends out a command for abandoning a communication cell between said first and second terminal equipment in said ATM exchanges when the result of the comparison by said comparing unit is such that the amount of traffic has exceeded the threshold value.

14. A system as set forth in claim 13, wherein said first and second terminal equipment include media classification notifying means which notify the classification of the communication media to said traffic control means.

15. An ATM communication process comprising the steps of:
a) performing communication between a first terminal equipment and a second terminal equipment, a first communication bandwidth required for the communication being sent through a first request means in the first terminal equipment on the originating side to an ATM switching network at the start of the communication;
b) monitoring the amount of traffic in the ATM switching network, analyzing the bandwidth allocable to the terminal equipment in the ATM switching network, and, when receiving the first communication bandwidth form the originating side of the first terminal equipment, sending the received first communication bandwidth together with the allocable bandwidth to the terminating side second terminal equipment;
c) receiving the allocable bandwidth and the first communication bandwidth, and sending the second communication bandwidth which the second terminal equipment requests for communication, through a second request means in the equipment to the ATM switching network side;
d) determining the available bandwidth to be commonly occupied by the first and second terminal equipment based on the first and second communication bandwidths and the allocable bandwidth; and
e) sending the determined available bandwidth form the ATM switching network side to the first and second terminal equipment.

16. A process as set forth in claim 15, further comprising the steps of:
f) storing the first and second communication bandwidths sent from the first and second terminal equipment at the start of the communication at the ATM switching network side;

g) determining whether the available bandwidth decided on can be received;

h) detecting, during the call between the first and second terminal equipment, if the allocable bandwidth exceeds the stored first and second communication bandwidths;

i) notifying the first and second terminal equipment side of the stored first and second communication bandwidths when it is detected that the allocable bandwidth exceeds the stored first and second communication bandwidths; and j) changing the presently used bandwidth in accordance with the respective decision means in said first and second terminal equipment.

17. An ATM communication system comprising:

an ATM switching network which includes a plurality of ATM exchanges and controls exchanges among a plurality of terminal equipment;

a management apparatus which manages the traffic in said ATM switching network;

a communication line layer, coupled to said management apparatus and said ATM switching network, which transfers information relating to traffic among said management apparatus and said ATM switching network; and notifying means, provided in said ATM switching network, for receiving the traffic information, and for notifying said plurality of terminal equipment of the allocable bandwidth which can be used in accordance with the amount of traffic in said ATM switching network.

18. A system as set forth in claim 17, wherein said ATM exchanges include traffic monitoring means for monitoring the amount of traffic in said ATM switching network; and wherein said management apparatus includes analyzing means for analyzing the allocable bandwidth which can be given to said plurality of terminal equipment in accordance with the amount of traffic.

19. A system as set forth in claim 18, wherein said management equipment is provided with optimal control means for producing optimal traffic control information based on the results of analysis by said analyzing means and for supplying the information to said ATM exchanges.

20. A system as set forth in claim 19, wherein said ATM exchanges are provided with traffic control means for receiving the optimal traffic control information supplied from said optimal control means and controlling the traffic.

21. A system as set forth in claim 20, wherein said ATM exchanges further comprise bandwidth changing means for receiving information from said traffic control means and notifying said plurality of terminal equipment of a change in the allocable bandwidth.

22. A system as set forth in claim 20, wherein said traffic control means includes:

a safety factor table unit which presets safety factors showing the range of allowance of fluctuations of traffic for each communication medium handled by said plurality of terminal equipment and stores these set safety factors as a table;

a threshold generating unit, operatively connected to said safety factor table unit, which generates a threshold obtained by multiplying the allocable bandwidth by the corresponding safety factors, for each of said communication medium;

a comparing unit, operatively connected to said traffic monitoring means and said threshold generating unit, which compares the traffic obtained by said traffic monitoring means and the threshold obtained from said threshold generating unit; and a cell abandonment instruction unit, operatively connected to said comparing unit, which issues an instruction for abandoning communication cells in said ATM exchanges when the result of the comparison by said comparing unit is that the traffic exceeds the threshold.

23. A system as set forth in claim 22, wherein said plurality of terminal equipment includes media classification notifying means for notifying the classification of said communication media to said traffic control means.

* * * * *

UNITED STATES PATENT AND TRADEMARK OFFICE
CERTIFICATE OF CORRECTION

PATENT NO. : 5,258,979

DATED : NOVEMBER 2, 1993

INVENTOR(S) : KATSUMI OOMURO ET AL.

It is certified that error appears in the above-identified patent and that said Letters Patent is hereby corrected as shown below:

TITLE PAGE, Col. 1, before "OTHER PUBLICATIONS", insert

--FOREIGN PATENT DOCUMENTS 0 214 625   3/1987   Europe.--;

TITLE PAGE, Col. 2, after line 8, insert the following:

--PATENT ABSTRACTS OF JAPAN, Vol. 12, No. 256 (E-635), July 19, 1988 & JP-A-63 042 543 (NTT).

IEEE GLOBAL TELECOMMUNICATIONS CONFERENCE & EXHIBITION, Hollywood, Florida, 11/28 - 12/1/88, "Communications for the Information Age", Conference Record, Vol. 1, pg. 203, 207, "A Congestion Control Framework for High-Speed Integrated Packetized Transport", G.M. Woodruff et al.--.

UNITED STATES PATENT AND TRADEMARK OFFICE
CERTIFICATE OF CORRECTION

PATENT NO. : 5,258,979
DATED : NOVEMBER 2, 1993
INVENTOR(S) : KATSUMI OOMURO ET AL.

It is certified that error appears in the above-identified patent and that said Letters Patent is hereby corrected as shown below:

Col. 22, line 50, "mean" should be --means--.

Col. 24, line 62, "form" should be --from--.

Signed and Sealed this

Twenty-sixth Day of July, 1994

Attest:

BRUCE LEHMAN

Attesting Officer  Commissioner of Patents and Trademarks